United States Patent Office 3,483,169
Patented Dec. 9, 1969

3,483,169
POLYESTER-POLYETHERS AND PROCESS OF PREPARING THE SAME
Leslie Catron Case and Laura Kaiser Case, both of 14 Lockeland Road, Winchester, Mass. 01890
No Drawing. Continuation-in-part of applications Ser. No. 168,062, Jan. 23, 1962, and Ser. No. 456,816, May 18, 1965. This application Aug. 21, 1967, Ser. No. 665,005
Int. Cl. C08g 30/12
U.S. Cl. 260—78.4         57 Claims

ABSTRACT OF THE DISCLOSURE

Novel hydroxyl- or carboxyl-terminated copolymers composed of a central core and polyester-ether copolymer chains with ether segments of randomly varying length are described. These copolymers may be mono- or polyfunctional and they are characterized by having a considerably narrower molecular weight distribution than condensation polymers. These copolymers also have very much lower melt viscosities than those of polycondensates of identical number-average molecular weight.

The present copolymers are generally prepared by reacting at elevated temperature and pressure, in the absence of strongly basic catalysts, a cyclic polycarboxylic acid anhydride, a cyclic monoether, and a compound having hydroxyl, carboxyl or sulfhydryl groups.

CROSS-REFERENCES TO RELATED APPLICATIONS

This application is a continuation-in-part of our co pending application Ser. No. 168,062, filed Jan. 23, 1962, and application Ser. No. 456,816, filed May 18, 1965 both cases now abandoned.

BACKGROUND OF THE INVENTION

Field of the invention

This invention is concerned with fusible, soluble, thermoplastic polymeric compositions. More particularly, this invention is concerned with novel polymeric materials related to the classes broadly referred to as polyethers and polyesters, being random copolymers of both, and the production of these copolymers.

Description of the prior art

The production of block copolymers containing both ester and ether linkages by polycondensation of a dibasic acid with a polyether glycol is known to the art. This method can be illustrated as follows:

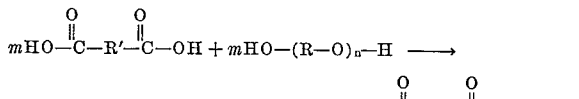

wherein $m$ and $n$ are whole numbers and R and R' are hydrocarbon connecting groups. This reaction yields a product which contains identical blocks of polyether units determined by the nature of the polyether glycol which has to be prepared by a separate reaction. The polycondensation reaction is slow, and requires heating for an extended period of time at quite elevated temperatures with attendant degradation of the product. Water is eliminated in the reaction and has to be moved, and with its removal there is a loss in volatiles. The process frequently requires a catalyst and residues thereof remain in the product. The molecular weight distribution of the polycondensation product is broad, and the polycondensates have undesirably high viscosities leading to handling difficulties. There are also definite limitations on the maximum molecular weight and on the maximum number of chemically reactive chain-end groups, e.g. the functionality, which can be readily obtained in such polycondensation polymers. To avoid some of the disadvantages associated with polycondensation, ordinary polyesters, which contain the simple recurring unit

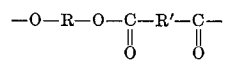

have been prepared by ring-opening polymerization of epoxides and anhydrides. Such preparations are described in U.S. Patents 3,089,863 and 2,822,350, and British Patents 500,300 and 839,773. Thus far, however, it has not been possible to prepare copolymers containing a substantial amount of polyether segments by the reaction of epoxides and anhydrides. If the reaction conditions disclosed in the art are employed and several moles of epoxide per mole of anhydride are used, we found much to our surprise that little or no epoxide in excess over a molar ratio of epoxide to anhydride of 1:1 becomes chemily combined; instead the excess epoxide employed remains unreacted and is readily recoverable.

SUMMARY OF THE INVENTION

According to the present invention there are provided novel, fusible, soluble, heat-incurable, thermoplastic copolymers having both ester and ether linkages in substantial quantity and in substantially random distribution within the polymer chains, with the ether linkages occurring in sequences of varying length, these sequences forming polyether units or segments between ester linkages. The amount of the ether linkages within each polyether segment varies, with the total amount of ether linkages being such that the average degree of polymerization of these polyether segments is at least 1.5. Furthermore, this average degree of polymerization of the polyether segments is preferably at least 2.0 and is usually a maximum of 8 for these novel products and is generally 6 or less. The degree of polymerization of a given ether segment is defined as the number of ether oxygens in the segment plus one.

These novel compositions are further characterized by having polymer chains with molecular weights of relatively high homogeneity and by generally having a ratio of weight-average molecular weight to number-average molecular weight of less than 1.5. Furthermore, the melt viscosities of these novel compositions are considerably lower, frequently by a factor of five to ten, than those of polycondensates of identical number-average molecular weight.

Another very desirable objective of the present invention is to provide polymeric compositions having a high degree of functionality, that is, having a large number of functional end groups. The polymer chain end groups in the compositions of this invention may consist of hydroxyl groups or carboxyl groups, and copolymers can be prepared having from one such end group per polymer molecule to more than twenty end groups per polymer molecule. The process of the present invention also allows the preparation of polymeric compositions of uniform functionality in which every polymer molecule has the same number of functionally reactive end groups.

The novel copolymers of this invention are composed of polymer molecules in which linear polymer chains emanate in branch-like fashion from, and are attached through ester and ether linkages to, a central core which is derived from an organic compound having hydroxyl groups and/or carboxylic acid groups, and/or sulfhydryl groups.

The central core may also be derived from hydrogen sulfide, water, and certain inorganic acids. The number of such polymer branch chains, which together with the central core constitute one polymer molecule, may vary from one to more than one hundred. The linear copolymer chains are essentially composed of two members: (X) homopolymerized polyether segments having the general formula $—(O—R)_n—$, and (Y) ester residues having the general formula $$—O—\underset{\underset{O}{\|}}{C}—R'—\underset{\underset{O}{\|}}{C}—$$

wherein R is a 1,2-alkylene or 1,3-alkylene radical and the residue —O—R— will be referred to hereinafter as a 1,3-oxyalkylene or 1,4-oxyalkylene radical, respectively, and is derived from a cyclic ether, such as an epoxide or an oxetane, by a ring-opening reaction, $n$ represents the degree of homopolymerization in the polyether segment, and is a positive integer varying substantialy randomly from at least one to more than 10, with the average value of $n$ being a positive number ranging from at least 1.50, and preferably at least 2.0, and frequently more than 2.0, to generally not more than 8, R' is a hydrocarbon radical connecting two carboxylic ester functions, and (Y) is derived from a polycarboxylic acid monoanhydride by a ring-opening reaction. The copolymer chains may comprise one such member or recurring sequences of the structural unit having the general formula $$—(O—R)_n—O—\underset{\underset{O}{\|}}{C}—R'—\underset{\underset{O}{\|}}{C}—$$

linked together to form polyether-polyester chains, wherein the symbols have the above-assigned meaning. Thus, the —O—R— residues constitute from $$3/5 \left(\text{e.g. } \frac{1.50}{1+1.50}\right)$$

up to about $$8/9 \left(\text{e.g. } \frac{8}{1+8}\right)$$

of the total number of residues in the structural unit, and the ester residues constitute from ⅑ to about ⅖ of the total number of residues in the structural unit. The copolymer chains are terminated by aliphatic hydroxyl or carboxylic acid groups.

The novel compositions can be provided in a wide range of molecular weights, varying from quite low to very high molecular weights, with the molecular weight being in general distributed approximately in accordance with the distribution known as the Poisson Distribution.

These novel polymeric compositions are produced by reacting together in intimate admixture (1) a cyclic monoether, difunctionally reactive under the process conditions and selected from the group consisting of epoxides and oxetanes, (2) a cyclic monoanhydride of an organic polycarboxylic acid and (3) a polymerization starter of the group consisting of water, hydrogen-containing inorganic acids capable of effecting a ring-opening reaction of cyclic ethers and organic compounds having at least one radical selected from the group consisting of hydroxyl, carboxyl and sulfhydryl groups, at a temperature of about 70° C. to 225° C. sufficient for the reactants to polymerize and at a pressure at least equal to the vapor pressure of the system at the reaction temperature. Suitable organic polymerization starters comprise alcohols, saccharides, thiols, phenols, carboxylic acids, hydroxyl-carboxylic acids and thiolcarboxylic acids. Valuable inorganic polymerization starters comprise water and hydrogen sulfide.

To produce the novel polyether-polyesters of this invention the cyclic ether must be present in substantial concentration intimately admixed with each of the other reactants during the reaction time in which a major part of the ring-opening polymerization occurs. Otherwise stated, the process must be carried out in a manner such that a substantial amount of the cyclic ether is present in admixture with the anhydride and the polymerization starting compound while at least 50 percent and advisably while 75 percent of the ring-opening polymerization reaction is effected. Furthermore, the cyclic ether should be present in admixture with the reaction mixture in such an amount that at last 0.3 equivalents of cyclic ether are advisably present per sum of equivalents of acid groups plus one-half the equivalents of anhydride present while a major amount of the reaction occurs. A maximum of six equivalents of cyclic ether in this same ratio is generally used. A minimum of 1.0, and preferably 1.5 or 2.0 equivalents of cyclic ether in said ratio gives polymers of particularly desirable properties. To produce the instant copolymers it is also essential that strongly basic compounds be completely excluded. The reaction mixture should advisably contain less than about a hundred, and preferably less than ten, and more preferably less than five parts per million by weight of strongly basic substances, such as oxides, hydroxides and salts of alkali metals, alkaline earth metals, ammonium ion and quaternary organic ammonium ions and the like.

The present process achieves simultaneously the homopolymerization of the cyclic ether into polyether segments and the copolymerizatoin in which the polyether segments become incorporated between ester linkages. Polymerization apparently proceeds by a random stepwise addition and leads to a product which can be characterized as a random composition mixture having polyether chain segments of varying length, in contrast to "block" or ordered sequence polymers in which the polyether segments between ester linkages are all of identical length. In the present product the number of ester and ether linkages is believed to be distributed more or less randomly, such as

—X—Y—XXXX—Y—X—Y—XX—Y
—XXX—Y—X—Y—XX—Y— where X=—(O—R)— is a cyclic ether residue, and $$Y = —(O—\underset{\underset{O}{\|}}{C}—R'—\underset{\underset{O}{\|}}{C}—)—$$

is the residue from the cyclic carboxylic acid anhydride. The above-illustrated portion of a polyester-polyether copolymer chain contains seven polyether segments varying in degree of polymerization from one up to four, with the average degree of polymerization of this polymer chain portion being two, obtained by dividing the sum of the X units, e.g. 14, by the number of chain segments composed of X units, e.g. 7 in number.

DETAILED DESCRIPTION OF THE INVENTION

The cyclic monoethers which we have found to be useful in preparing the compositions of the present invention comprise 1,2-alkylene oxides, generally known as epoxides, and 1,3-alkylene oxides, generally known as oxetanes. Particularly preferred epoxides are the terminal monoepoxides having the general structural formula $$—\underset{}{CH}—\underset{}{CH_2}$$
$$\diagdown\;O\;\diagup$$

wherein the residual valence can be satisfied by hydrogen, alkyl, cycloalkyl, aryl, aralkyl, alkaryl and haloalkyl hydrocarbon radicals. It should be pointed out that as used herein and in the appended claims, the term "terminal monoepoxide" will be used to describe and should be interpreted to encompass epoxides of the type illustrated above. Internal monoepoxides are also of value in certain instances, and the term "internal monoepoxide" as used herein and in the appended claims is used to describe and should be understood to encompass epoxides of the general formula $$—\underset{}{CH}—\underset{}{CH}—$$
$$\diagdown\;O\;\diagup$$

wherein the residual valences are satisfied by alkyl, cycloalkyl, cycloalkylene, aryl, aralkyl, and alkaryl hydrocarbon radicls.

The cyclic ethers employed should possess only one difunctionlly reactive cyclic ether group, that is, they should be selecetd from the group consisting of monoepoxides and monooxetanes. The cyclic monoethers may carry substituents which do not interfere with the copolymerization, such as alkyl, alkoxy, ester and halo radicals and the like. Cyclic monoethers with hydroxyl groups, such as glycidol may be of value and can be employed. It should be noted that cyclic ethers containing an olefinic unsaturation which is capable of undergoing a cross-linking reaction under the process conditions are advisably excluded in the practice of this invention. In particular, the use of such cyclic ethers in combination with unsaturated acid anhydrides, such as maleic anhydride, should be avoided if satisfactory results are to be obtained.

Some particularly preferred monoepoxides for use in the process are the saturated aliphatic terminal 1,2-monoepoxides of not more than ten, and advisably not more than six carbon atoms, and having from zero to three halogen substituents such as chloro or bromo radicals. Epoxides having up to 21 carbon atoms, such as those derived from epoxidation of olefines, in particular terminal 1,2-olefines having as many as 20 carbon atoms, and glycidyl esters of aliphatic acids having up to 18 carbon atoms, such as glycidyl stearate or glycidyl oleate, may also be employed.

Representative of the terminal saturated lower aliphatic monoepoxides which can be used in the process are such epoxides as ethylene oxide, propylene oxide, 1,2-butylene oxide and 1,2-octylene oxide. Epichlorohydrin, epibromohydrin, epicyanohydrin and styrene oxide are also useful. Mixtures of epoxides may also be employed.

Examples of useful internal olefines are 2,3-butylene oxide, cyclohexene oxide and cyclopentene oxide. The lower alkyl esters of such acids as epoxidized oleic acid, epoxidized palmitoleic acid, vernolic acid, epoxidized erucic acid and epoxidized elaidic acid may also be employed. Specifically epoxidized methyl oleate and epoxidized ethyl oleate are useful.

Cyclic ethers having oxygen located in a heterocyclic ring of four members, such as trimethylene oxide, 3,3-dimethyl trimethylene oxide and 3,3-bischloromethyl trimethylene oxide can also be used in place of epoxides. Mixtures of such compounds with epoxides are also useful as reactants. Preferred for use are oxetanes and substituted oxetanes having from three to six carbon atoms and from zero to six halogen substituents selected from the group consisting of chloro and bromo radicals.

The most preferred cyclic ethers for use in the preparation of the copolymers of this invention are propylene oxide and ethylene oxide, because of their ready availability, high reactivity, and the very desirable properties of the polyether-ester compositions resulting therefrom. For many uses the most preferred cyclic ether is propylene oxide.

The cyclic monoanhydrides used in the process can be aromatic, saturated or partially saturated aliphatic, cycloaliphatic and heterocyclic anhydrides. Such anhydrides having from four to fourteen carbon atoms and zero to six halogen substituents and having the general structural formula

wherein R' is a hydrocarbon radical having from two to twelve carbon atoms and from zero to six halogen substituents selected from the group consisting of chloro and bromo radicals are especially useful. Particularly preferred are cyclic monoanhydrides derived from 1,2-dicarboxylic acids having from four to twelve carbon atoms and from zero to six halogen substituents. Those anhydrides which are presently particularly preferred in the process are phthalic anhydride, 3,4,5,6-tetrachlorophthalic anhydride, 3,4,5,6-tetrabromophthalic anhydride, tetrahydrophthalic anhydride, maleic anhydride, dichloromaleic anhydride, succinic anhydride, itaconic anhydride, and 1,4,5,6,7,7-hexachloro-bicyclo-(2,2,1)-5-heptene - 2,3 - dicarboxylic acid anhydride, hereinafter called Chlorendic anhydride. Also useful are such anhydrides as diphenic anhydride, glutaric anhydride, diglycolic acid anhydride, dodecenylsuccinic anhydride, hexahydrophthalic anhydride, trimellitic anhydride, endo-cis-bicyclo-(2,2,1)-5-heptene-2,3-dicarboxylic acid anhydride (sometimes referred to as Nadic anhydride), its methyl-substituted derivatives (sometimes referred to as Methyl Nadic anhydride), and bicyclic adducts of maleic anhydride or tetrahydrophthalic anhydride with cyclic aliphatic diolefines, such as vinylcyclohexene, cyclopentadiene, and hexachlorocyclopentadiene.

The most preferred anhydrides are phthalic anhydride, maleic anhydride, and succinic anhydride because of their ready availability and the widely useful compositions produced therefrom.

Another very preferred group comprises the halogenated cyclic monoanhydrides. Because of their high halogen contents, Chlorendic anhydride, tetrachlorophthalic anhydride, and tetrabromophthalic anhydride are highly useful in the formation of polymers with flame retardation and self-extinguishing properties. The process of the present invention is particularly valuable for use with such anhydrides since quite unexpectedly these halogenated anhydrides exhibit a very high reactivity in the process of the present invention and readily enter into reaction at relatively low temperatures, and quite surprisingly yield polyether-esters of relatively low melt viscosities. Previous to the present invention, halogenated acids and anhydrides required very high reaction temperatures and exceedingly long reaction times to enter into polyester formation and prior art products had undesirably dark colors and high viscosities. In contrast, the present invention provides fluid compositions rapidly and at relatively low temperatures.

Cyclic anhydrides other than those named can be used in the instant process. Also, a single anhydride can be used or mixtures of anhydrides can be employed.

The use of cyclic monoethers and cyclic monoanhydrides which are difunctionally reactive only constitutes the preferred embodiment of this invention. The use of very small amounts of polyepoxides and cyclic polyanhydrides in combination with monoethers and monoanhydrides may also be of value in some instances. Small amounts of diepoxides of six to 18 carbon atoms containing a cycloalkyl group, such as vinylcyclohexene diepoxide, for example, and various diglycidyl ethers of aliphatic and aromatic diols, as well as dianhydrides, such as pyromellitic dianhydride can be of use in combination with monoethers and monoanhydrides on occasion.

The polymerization starters which are useful in preparing the compositions of the present invention comprise organic compounds having at least one active-hydrogen-containing radical selected from the group consisting of hydroxyl, e.g. OH, carboxyl, e.g. COOH, and sulfhydryl, e.g. SH, radicals. Especially preferred for use are polymerization starters having at least three such radicals, and polymerization starters having in excess of one hundred such radicals may be employed. It is a particularly unexpected and very valuable feature of the present invention that polymerization starters of such high functionality can readily be reacted to form useful compositions. The functionality of the polymerization starter employed is critical since it determines the functionality of the copolymer produced. Copolymers derived from mono- and di-functional starters are linear and are therefore generally not suitable for cross-linking through the hydroxyl and/or carboxylic acid polymer chain end groups to form thermoset resins. There are additionally distinct differences in behavior between copolymers derived from mono- and di-functional starters. The compatibility of the monofunctional polymers with nonpolar solvents is generally significantly better than that of the difunctional copolymers, and the monofunctional polymers are also generally more resistant to hydrolytic attack than the difunctional polymers. Copolymers derived from starters having functionalities of at least three are suitable for cross-linking into thermoset resins through the reactive polymer chain end groups. For certain applications, such as the formation of rigid polyurethane foams, functionalities of at least four, and preferably at least five are desirable. Quite unexpectedly and surprisingly the novel high-functionality copolymers of the present invention possess exceptionally low viscosities.

Organic starters may be saturated or unsaturated and, in addition to hydroxyl, carboxyl and sulfhydryl radicals, may contain other substituents, such as alkyl, ether, ester, cyano and halo radicals, and the like, but these substituents should not be reactive with cyclic ethers and cyclic anhydrides under the process conditions. Useful organic polymerization starters comprise alcohols, ether alcohols, hydroxy alkyl esters, carboxylic acids, hydroxy-carboxylic acids, phenols, mercaptans, thiocarboxylic acids, thiolcarboxylic acids, monosaccharides, and polysaccharides. Particularly preferred for use are polymerization starters having alcohols hydroxyl groups.

Water and inorganic hydrogen-containing acids which are capable of effecting the ring-opening reaction of cyclic ethers, and aqueous solutions thereof, may also be employed as polymerization starters. Examples of hydrogen-containing inorganic acids which may serve as polymerization starters are hydrogen sulfide, phosphoric acid, phosphorous acid, boric acid, arsenious acid, hydrocyanic acid, hydrochloric acid, hydrobromic acid and hydrofluoric acid. For example, a phosphorous-containing polymerization starter may be of value when the final product should have flame-retarding properties. It is to be understood, however, that inorganic acids which destructively decompose organic compounds, such as nitric acid, for example, are advisably not employed. It is also frequently undesirable to use inorganic acids which form hydrolytically unstable ester linkages, such as sulfuric acid or phosphoric acid, for example.

Polymerization starters may be used singly or mixtures of two or more starters may be employed. Water and aliphatic alcohols are especially desirable as components of such mixtures. Examples of particularly preferred combinations of starters are alcohol-water solutions, saccharide hydrates, and alcoholic and aqueous solutions of saccharides.

One very preferred group of polymerization starters are those having non-phenolic aliphatic hydroxyl groups. This group comprises aliphatic alcohols, ether alcohols and saccharides. Aliphatic alcohols having from one to 18 carbon atoms and from one to eight hydroxyl groups and polyether glycols of from four to 15 carbon atoms are very useful. Especially preferred for use are the higher functionality aliphatic polyols having from three to 15 carbon atoms and from three to eight hydroxyl groups.

Representative alcoholic polymerization starters that can be used are mono- and poly-hydroxy-containing alcohols, such as methanol, ethanol, trichloroethanol, tribromoethanol, trifluoroethanol, propanol, butanol, pentanols, hexanol, stearyl alcohol, benzyl alcohol, allyl alcohol, methallyl alcohol, telomer alcohols, that is free radical adducts of methanol and tetrafluoroethylene, ethylene glycol, propylene glycol, butylene glycol, halohydrins, and cyanohydrins, that is alcohols having the structure

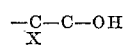

wherein X is selected from the group consisting of halo and cyano radicals, such as for example ethylene chlorohydrin, ethylene bromohydrin, ethylene cyanohydrin, dipropylene glycol, dibutylene glycol, diethylene glycol, triethylene glycol, tripropylene glycol, tetraethylene glycol, 1,12-octadecanediol, ethyl 12-hydroxystearate, glycerol, trimethylolethane, trimethylol propane, triricinolein (castor oil), pentaerythritol, dipentaerythritol, tripentaerythritol, sorbitol, xylitol, mannitol, erythritol, and inositol. An especially preferred alcohol polymerization starter is a commercially available mixture of aliphatic polyols having from three to six carbon atoms and from three to six hydroxyl groups, and an average molecular weight of about 160 and an average equivalent weight of about 32.

Polymeric alcohols, such as for example polyvinyl alcohol and partially hydrolyzed polyvinylacetate, and polyether polyols having from three to eight hydroxyl groups and molecular weights ranging from about 100 to about 5,000, such as oxyethylene and oxypropylene adducts of polyols like glycerol or sorbitol, or of saccharides, like glucose, are also of value as polymerization starters.

Saccharides constitute another group of very preferred high-functionality polymerization starters. Suitable starters may be selected from the group consisting of monosaccharides, disaccharides, trisaccharides, higher polysaccharides having more than three monosaccharide residues per molecule, saccharide ether derivatives, also referred to as glucosides, saccharide hydrates and solubilized polysaccharide solutions.

Preferred for use are monosaccharides, disaccharides and trisaccharides having from five to 18 carbon atoms and from four to 11 hydroxyl groups. Especially preferred are monosaccharides and disaccharides. Examples of especially suitable compounds include among others dextrose, also known as glucose, xylose, sucrose, lactose, and maltose. Higher polysaccharides having more than three monosaccharide unit building blocks per molecule are also very suitable. Examples of such higher polysaccharides are cyclodextrins, such as alpha-cyclodextrin, beta-cyclodextrin and gamma-cyclodextrin, and polysaccharides of less-well-defined composition, such as molasses, corn syrup, and solubilized starches, such as solubilized corn starch, or potato starch, and the like. Products resulting from the modification and degradation of cellulose, such as partially esterified cellulose acetate may also be of value.

A very preferred embodiment contemplates the use of polysaccharides having at least three, and preferably more than three, monosaccharide units per molecule in admixture with saturated aliphatic alcohols having at least one, and advisably at least two, and preferably at least three carbon atoms and at least one, and advisably at least two, and preferably at least three hydroxyl groups. Polyols having a melting point of about 125° C. or less are preferred in this embodiment. Especially preferred are saturated aliphatic polyols having from three to six carbon atoms and from three to six hydroxyl groups. Polysaccharides very suitable for use in admixture with aliphatic alcohols comprise homopolysaccharides and heteropolysaccharides composed of monosaccharide unit building blocks having from five to six carbon atoms per monosaccharide unit. Preferred for use are higher polysaccharides of the general chemical composition $(C_6H_{10}O_5)_z$ where $z$, the degree of polymerization, is at least three, and preferably more than three. The polysaccharide should advisably be soluble or solubilizable in the aliphatic alcohol starter component and formation of a homogeneous polymerization starter mixture prior to reaction with the cyclic ether and the cyclic anhydride is frequently preferred. Very suitable polysaccharides are those having a solubility in water at 25° C. of at least 50 percent, and advisably at least 75 percent, and preferably at least 90 percent by weight. Polysaccharides without the requisite solubility may be solubilized by dispersing them in the aliphatic alcohol and heating this dispersion at a temperature of about 75° C. to about 200° C., and preferably of about 100° C. to about 180° C. for a period of time sufficient to bring about the formation of a gel, or preferably a viscous, clear, homogeneous solution. The length of time required will depend on the temperature and the components and will generally vary from as little as about 15 minutes up to about 24 hours or more. In this solubilization process a partial degradation of the very-high-molecular-weight insoluble, or partially insoluble, polysaccharide to a somewhat lower-molecular-weight, soluble, polysaccharide may take place, and such degradation products should be understood to be included in the scope of the present invention. Other standard procedures may be employed to effect solution. Suitable polymerization starter solutions will advisably be soluble in water at 25° C. to the extent of at least 50 percent by weight.

Useful polysaccharides having more than three saccharide units per molecule are linear, branched, and cyclic dextrins, starches, plant gums, mucilages, dextrans, pectins, molasses, syrups, and compounds resulting from cellulose by modification and degradation. The term dextrin is used herein and in the art to describe polysaccharide products of a complex nature resulting from the partial degradation of starch, such as corn starch, potato starch, wheat starch, and the like, in the presence of heat alone, e.g. by roasting, or in combination with acid, or by enzymes. Available linear and branched dextrins are produced in three types, depending on the heating time, temperature, and catalyst employed in the treatment of the starch. These types are classified as white dextrins, yellow or canary dextrins, and British Gums, and all such dextrins are suitable. The term plant gum and vegetable mucilage as used herein and in the art refers to naturally occurring plant exudates or extracts having a complex polysaccharide structure. Dextrans comprise complex polysaccharides synthesized by microorganisms. Representative of very useful polysaccharides are dried corn syrup solids, corn dextrins, potato dextrins, wheat dextrins, alpha-cyclodextrin, beta-cyclodextrin, gamma-cyclodextrin, tragacanthin, gum acacia, Ghatti gum, karaya gum, gum arabic, mesquite gum, damson gum, gum tragacanth, flaxseed mucilage, dextran, pectin, potato starch, corn starch, wheat starch, tapioca starch, and rice starch. Particularly preferred for use are the white corn dextrins, the canary corn dextrins, British Gums, cyclodextrins, corn starch, potato starch, and wheat starch. The proportion of polysaccharide in the polysaccharide-polyol starter mixture will generally range from about five percent to about 90 percent, and advisably to no more than 80 percent, and preferably from about 20 percent to about 60 percent by weight based on the weight of the combined starter mixture. If less than five percent of the higher polysaccharide is employed the starter mixture differs little from the pure alcohol whereas if more than 80 percent of the polysaccharide is employed the viscosity of the starter solution may be undesirably high. These polyol-polysaccharide mixtures provide polymerization starters of extraordinarily high functionality, since the hydroxyl functionality of the polysaccharide component of the starter mixture may range from about 10 up to about 100,000, or even more. Useful polysaccharides frequently have hydroxyl functionalities of from 100 up to 10,000, and even higher.

Other useful saccharide starters are the simple and complex glucosides prepared by the reaction of a monosaccharide, such as glucose, or a polysaccharide, such as starch, corn syrup, dextrins and the like, with an alcohol selected from the group consisting of monofunctional aliphatic alcohols having from one to 18 carbon atoms, such as methanol, ethanol and the like, aliphatic glycols and ether glycols of from two to nine carbon atoms, such as ethylene glycol, propylene glycol, diethylene glycol and the like, and aliphatic polyalcohols having from three to six carbon atoms and from three to six hydroxyl groups, such as glycerol, sorbitol, and the like. The alcoholic compound may advantageously also possess carboxylic acid substituents and hydroxy-carboxylic acids having from two to six carbon atoms and from one to three hydroxyl groups and from one to three carboxylic acid groups, such as for example, glycolic acid, also known as hydroxy-acetic acid, malic acid, citric acid, and hydroxyadipic acid are also valuable in preparing the glucoside starters.

Examples of readily available glucosides which are very suitable are alpha-methyl glucoside and ethylene glycol diglucoside. Other glucosides are readily prepared by techniques known to the art, such as by reacting the monosaccharide with the alcoholic compound in aqueous solution. Techniques for the preparation of glucosides from the higher polysaccharides, such as starch, are also well known. Frequently degradation of the higher polysaccharides, such as starch, and formation of the glucoside are carried out simultaneously. This reaction generally requires an acidic catalyst, so that the use of a carboxy-functional alcohol is especially favorable in that an added catalyst may not be required. The use of hydroxyacetic acid is especially favorable in this embodiment.

As mentioned above, water has also been found to be a useful polymerization starter and it has been found that the hydrates of polyols and saccharides may also be used as well. Examples of useful hydrates are those of dextrose, maltose, lactose, raffinose, sorbitol, and others.

In one of the especially preferred embodiments of this invention, aqueous solutions of polyols and aqueous or alcoholic solutions of saccharides are used as polymerization starters. Specifically, the use of aqueous solutions of such compounds as sorbitol, and the use of aqueous or alcoholic solutions of such compounds as dextrose, sucrose, dextrins, gums and starches as polymerization starting materials constitutes a very valuable embodiment of this invention. These materials are also particularly attractive from an economic point of view because of their low cost. The proportion of water or alcohol in such a starter solution will generally range from about 2 to about 98 percent by weight. Concentrated aqueous solutions containing less than 50 percent, and preferably less than 30 percent, by weight of water based on the weight of the starter are usually preferred.

It is a totally unexpected and particularly valuable discovery that the process conditions of the present invention make possible the use of saccharides, and especially of higher polysaccharides, as polymerization starters. If an anhydride, such as phthalic anhydride, and a saccharide are combined in the absence of any substantial concentration of epoxide, very poorly soluble crystalline half-ester adducts are formed, which precipitate out and do not enter into further reaction. If, however, the saccharide, the anhydride, and an epoxide are combined and reacted according to the teachings of the present invention this insolubility problem, quite surprisingly, is not encountered. Apparently, further immediate reaction of the half-ester acid with the epoxide maintains the concentration below the solubility limit of the saccharide adduct.

Examples of phenolic hydroxy-containing compounds which are useful are phenols having from 6 to 15 carbon atoms and from one to three phenolic hydroxyl groups, such as phenol, cresol, xylenol, resorcinol, catechol, phloroglucinol, and 2,2-bis(4-hydroxyphenyl)propane. Polymeric compositions with phenolic hydroxyl groups may also be employed.

Organic carboxylic acids and hydroxy-carboxylic acids comprise another group of useful polymerization starters. Carboxylic acids which are preferred are those having from two to 54 carbon atoms and from one to four carboxylic acid groups, such as acetic acid, trichloracetic acid, trifluoroacetic acid, propionic acid, butyric acid, perfluorobutyric acid, perfluorooctanoic acid, maleic acid, fumaric acid, succinic acid, adipic acid, stearic acid, benzoic acid, acrylic acid, methacrylic acid, linoleic acid, linoleic acid dimer, linoleic acid trimer, oleic acid, aconitic acid, isophthalic acid and tricarballylic acid. Other acids, such as pyromellitic acid, terephthalic acid and trimellitic acid may also be of value. Very preferred are aliphatic acids having from one to 18 carbon atoms.

Examples of hydroxy-carboxylic acids which have been employed are those having from two to 18 carbon atoms, from one to five hydroxyl groups and from one to three carboxyl groups, such as hydroxyacetic acid, citric acid, malic acid, tartaric acid, 12-hydroxystearic acid, ricinoleic acid and gluconic acid. Acidic natural products, such as gum copal, gum dammar and abietic acid may also be used. Other available carboxylic acids and hydroxycarboxylic acids can be used.

Sulfhydryl-group-containing compounds useful as polymerization starters comprise aliphatic mono- and polythiols, especially alkyl mercaptans containing from one to 12 carbon atoms, thiophenols, aliphatic thiol carboxylic acids and esters thereof with aliphatic polyols, and thiocarboxylic acids. Useful sulfhydryl starters will have from one to 24 carbon atoms, and from one to six sulfhydryl radicals. Examples of sulfhydryl compounds that may be employed include ethyl mercaptan, propyl mercaptan, butyl mercaptan, octyl mercaptan, monothio-, dithio-, and trithio-glycerol, alpha-mercaptoacetic acid, beta-mercaptopropionic acid, pentaerythritoltetrakis-beta-mercaptopropionate, pentaerythritol - alpha - mercaptoacetate, glyceroltris - beta - mercaptopropionate, glyceroltris - alphamercaptoacetate, sorbitol - beta - mercaptopropionate, sorbitol - alpha - mercaptoacetate (various esters), and thiopenol and thiocresol. Thiokol-type polymers having free sulfhydryl groups and molecular weights of generally not more than 10,000 and sulfhydryl derivatives of cellulose may also be of value.

The reaction between the cyclic anhydride and the cyclic ether, and the homoreaction of the cyclic ether with itself is effected by bringing the reactants and the polymerization starter together, advisably at an elevated temperature and at superatmospheric pressure, in a manner such that a substantial concentration of the cyclic ether is present intimately admixed with the other reactants during the time in which the major part of the reaction takes place. The presence of a substantial amount of cyclic ether in the reaction mixture during the reaction period in which most of the copolymerization takes place is an essential requirement in preparing the copolymers of this invention. The reactants are advisably combined so that during the time in which at least 50 percent of the polymerization takes place, the ratio of equivalents of cyclic ether to the sum of equivalents of acid groups plus one-half the equivalents of anhydride groups in the reaction mixture is at least 0.3. For purposes of this invention, one equivalent of cyclic ether is taken to be one mole of cyclic ether residue, and one equivalent of acid or anhydride is taken to be equal to that amount which is required to neutralize one mole of sodium hydroxide, e.g. one equivalent of an acid group is equal to one mol of carboxylic acid divided by the number of carboxylic acid groups per mol, and one mol of anhydride equals two equivalents, so that one-half the number of equivalents of anhydride present generally equals the number of mols present. This ratio of equivalents can be readily determined at any stage of the reaction by titration or other standard techniques known to the art. While is is frequently convenient to combine all of the reactants initially before heating the reaction mixture, it is to be understood that the entire amount of cyclic ether or all of the anhydride does not have to be present at the start of the reaction, but that these reactants may be suitably added in several substantial, sizable portions by means of a few large batch-wise additions during the course of the polymerization reaction. In order to effect the homopolymerization of the cyclic ether to polyether segments it is absolutely essential however, that the cyclic ether is not added in a large number of very small increments which would result in a very low concentration of cyclic ether while the reaction proceeds. Thus, the cyclic ether cannot be added dropwise as the reaction proceeds because this mode of operation results in a minute instantaneous concentration of cyclic ether, and produces a pure polyester.

In a batch operation a temperature of 70° C. or higher is usually used although a temperature above 180° C., and advisably above 160° C. is generally not required and may lead to adverse results. In a continuous operation in which the residence times are very short, temperatures as high as 225° C., but advisably not more than 200° C. may be used. For best results the copolymerization is conducted at a temperature below that at which the condensation reaction between the alcoholic hydroxyl groups and the carboxylic acid groups resulting from the ring-opening reactions of the epoxide and anhydride employed, respectively, takes place to any significant extent. With some reactants the polymerization, once in progress, may become so exothermic as to require cooling to keep the reaction mixture within a suitable temperature range. For batch systems the most suitable temperatures for the process are about 100° C. to 180° C., and more preferably about 120° C. to 160° C. However, lower and higher temperatures can be used as warranted by the reactants employed. If saccharides are employed the reaction is preferably conducted within a temperature range of about 120° C. to 150° C. If strong acids such as phosphorous-containing acids are used as starting compounds, or if halogenated anhydrides such as Chlorendic anhydride or dichloromaleic anhydride are employed, the temperature necessary to achieve reaction is considerably lowered. For example, polymers from Chlorendic anhydride, a polyol and an epoxide are formed at a rapid rate at 70° C. The polymerization of a few extremely reactive systems such as those using maleic acid and phosphoric acid as starters may proceed exothermically even at room temperature, and may require cooling.

The process of this invention is advisably conducted in a closed system at superatmospheric pressures. Superatmospheric pressure, such as autogeneous pressure is used although even higher pressures are very suitable in producing the copolymers. A minimum pressure of 1.5 atmospheres is advisably used. With the lower epoxides as reactants, the pressure under which the polymerization is conducted varies from about 50 pounds per square inch (p.s.i.) to about 300 p.s.i. The polymerization can be effected batchwise, in a closed vessel, such as an autoclave equipped with agitation, or under continuous conditions in a tubular reactor at elevated pressures. Because of the acidic nature of the reaction suitable equipment must be employed. Such materials as glass and 316 stainless steel have been found suitable for use in preparing these compositions. Other materials of sufficient corrosion resistance may be employed. Reaction times for completion of the copolymerization depend on the specific reactants and the reaction temperature and may range from a few minutes to several hours. Preferred are reaction times of less than eight, and more preferably less than six hours and frequently not more than four hours. In order to minimize any side reactions reaction times of more than twelve hours are advisably avoided. Since the process is run in a completely closed system and since the present polymerization, unlike polycondensation reactions, does not require the removal of small molecules, such as water or alcohol, in order to proceed to completion, any losses of volatile reactants are avoided. An inert atmosphere, such as nitrogen or argon, may desirably be employed with oxidation-sensitive reactants, such as maleic anhydride and the like.

The process of this invention proceeds under inherently acidic conditions and does not require the use of a catalyst. However, strong acids have been found to act as catalysts and if strong acids, viz those which ionize at least as much as bromoacetic acid, or anhydrides derived from strong acids are used as reactants, the process becomes autocatalytic. The present process is inherently acidic since the cyclic carboxylic acid anhydride opens during the reaction to form an acid half-ester intermediate, thereby ensuring that carboxylic acid groups are present during the polymerization. Since no catalyst residues remain in the final product there is no need to purify the final copolymer. Furthermore, additional post-treatment steps needed in other processes to remove catalyst residues are not required in this invention.

It should be noted in this regard that, in order to produce copolymers having ether segments of significant length, it is essential during the period in which unreacted free anhydride is present in the reaction mixture to avoid the presence of any strongly basic catalysts, such as quaternary ammonium hydroxides, inorganic hydroxides of alkali metals and alkaline earth metals, as well as salts and oxides of these metals and organic amines which exhibit strongly basic properties. The presence of trace amounts of such basic substances appears to alter the course of the reaction and, if the reactants are employed in the proportions set forth herein, results in simple polyesters with essentially no polyoxyalkylene segments and with much higher viscosities, plus unreacted cyclic ether. Thus, when reactants derived from natural sources are employed, they should advisably be low in content of basic ash.

The present process permits the use of monomers of lower initial cost than previous processes, and of monomers which are ordinarily quite unreactive. This, plus the greater convenience, ease and speed of operation, result in considerable savings in the overall cost of the final product.

An excess of cyclic ether over the amount stoichiometrically needed to react with the cyclic anhydride has to be used in the process. Without an excess of cyclic ether the polymerization does not go to completion in that not all of the anhydride reacts. At least a 50% stoichiometric excess of cyclic monoether is used, e.g. 1.50 moles of monoepoxide or oxetane per mol of anhydride. Usually at least a 100% stoichiometric excess of cyclic ether is used and to obtain the most desirable polymers at least 150% stoichiometric excess of monoepoxide to anhydride is employed. The mol ratio of cyclic monoether to anhydride is thus at least 1.50, advisably at least 2.00, and for best results at least about 2.50. The molar ratio of cyclic ether to anhydride will occasionally be as high as six, and will generally not be more than eight. The nature and amount of starter used should also be considered when selecting the ratio of epoxide to anhydride. The ratio of cyclic monoether to anhydride will generally be somewhat higher when acidic starters are used.

After the polymerization is terminated any uncombined excess cyclic ether can be removed. Even though an excess of cyclic ether is used in the process, when careful control is exercised complete reaction of all components is achieved, and the final acid number can be as low or as high as desired. (The acid number of a polymer is defined as the milligrams of potassium hydroxide required to neutralize the acid end groups in 1000 grams of polymer.) If it is found that the resulting product has a higher acid number than desired, the epoxide content for the next run can be increased, as required, to lower the acid number to the level desired. The nature of the polymer chain end groups is thus easily controllable. The polymer chains will be terminated by either hydroxyl or carboxylic acid groups and the total number of end groups will be equal to the sum of the two.

The nature of the end groups is determined by the relative concentration of cyclic ether and anhydride in the terminal stages of the polymerization. Hydroxyl end groups are formed from the final addition of cyclic ether to the growing polymer chain and carboxylic acid end groups result from the final reaction of the polymer chain with an anhydride molecule. The ratio of hydroxyl end groups to carboxylic acid end groups in these compositions will depend on the ratio of cyclic ether to anhydride reacted, on the nature and amount of starter used, on the desired equivalent weight of the polymer, and will be specifically different with particular reactants and reaction conditions. Very approximately, as an example, carboxylic acid groups will ordinarily predominate if alcoholic hydroxyl-group-containing starters and mol ratios of propylene oxide to phthalic anhydride of about 2 or less are used to produce polymers with equivalent weights of about 200 to 500, at cyclic ether-to-anhydride ratios between about 2 and 3 both carboxylic acid end groups and hydroxyl end groups will be formed in significant amounts and varying proportion, and at ratios of about 3 or more the polymer chains will be largely terminated by hydroxyl groups. If carboxylic acid starters are used, some additional amount of epoxide will be consumed in reacting with the carboxylic acid groups in the starter, and the ratios of epoxide to anhydride will thus be slightly larger. It should be understood that the exact specific requirements will vary in each instance with the particular reactants and reaction conditions employed.

The important consideration in determining the amount of starter to be used is the ratio of the polymer equivalent weight desired to the starter equivalent weight. The equivalent weight of the starter is computed by dividing the starter molecular weight by the number of functional groups capable of starting the polymerization reaction. The equivalent weight of the polymer is computed by dividing the polymer molecular weight by the number of polymer chain-end groups. Thus the ratio of the weight of starter used to the total weight of the polymer formed is the same as the ratio of starter equivalent weight to the polymer equivalent weight.

Suitable amounts of polymerization starter employed in the process will range from about 0.1 percent to generally not more than 75 percent, and frequently not more than 50 percent by weight of the total reactant mixture. In general, larger amounts of higher molecular-weight starting materials are used than those of lower molecular weight. When compounds of low molecular weight, such as water, or hydrogen sulfide, are used, the amount of starter will generally not exceed 10 percent by weight of the total reactant mixture. In some instances involving starters of high equivalent weight, or polymers of low equivalent weight, the proportion of starter may exceed 50 percent by weight of the total reactant mixture. For example, if a low-molecular-weight polymer is formed by reacting an epoxide and an anhydride using stearyl alcohol as the starter, about 50 percent of the total polymer weight could be derived from the starter residue.

The resulting polyether-polyester copolymers are novel thermoplastic, fusible, soluble, polymers and retain these properties on prolonged heating at elevated temperatures. The copolymers of the present invention are incurable by the mere application of heat. These copolymers thus contrast sharply and distinctly with the fluid, but heat-curable, thermosetting intermediates which are encountered in the cross-linking of epoxy resins with cyclic anhydrides in the presence of alcohols, which intermediates cross link by the application of heat to insoluble, infusible, cured compositions.

The novel copolymers resulting from the process of the present invention contain both ether and ester linkages in substantial proportion. Under the acidic conditions of the process the aliphatic ether linkages are formed by the reaction between hydroxyl groups and cyclic ether groups. There are two reactions of this type (1) the reaction of the starter with cyclic ether

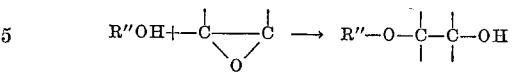

and (2) the homopolymerization of cyclic ether by addition to the growing polymer chain

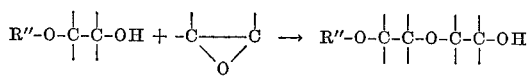

The ester linkages are formed by the reactions of hydroxyl groups with anhydrides and of acid groups with cyclic ethers according to:

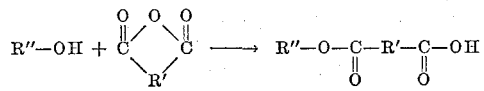

and

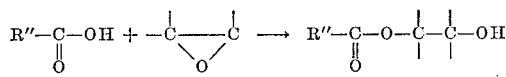

where R″ hereinabove represents a residue attached to the active-hydrogen containing radicals of a starter molecule, or a growing polymer chain. A very small quantity of ester linkages is probably also formed under the reaction conditions by the side reaction of hydroxyl and carboxylic acid groups. Polymerization by the process of the invention is essentially a ring-opening polymerization proceeding under acidic conditions with the above-described individual reactions taking place simultaneously and in sequence in a complex manner.

The polymerization is initiated by the starter and the residue attached to the active hydrogens of the starter thereby becomes a central core from which polymer chains originate and to which they are attached through ester and ether linkages. If sulfhydryl-group-containing starters are used the polymer chains are attached through thioether and thioester linkages to the starter residues. The polymer chains grow by stepwise ring-opening addition of cyclic ether and cyclic anhydride to form a copolymer which contains polyether segments, $-(O-R)_n-$, of varying degree of polymerization connected to each other through anhydride-derived carboxylic acid residues,

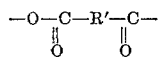

which reacted to form ester linkages, wherein R, R′, and $n$ have the previously assigned meaning. The polymer chains are terminated by hydroxyl and carboxyl end groups. The amount of polymerization starter residue in these copolymers will vary from about 0.1 to generally not more than 75 percent, and preferably not more than 50 percent, by weight, and the amount of $-O-R-$ radicals from about 10 to 65 percent, and preferably from about 25 to 55 percent by weight, with the remainder being essentially composed of

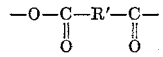

radicals, and with the ratio of $-O-R-$ to

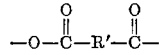

being at least 1.5, and preferably at least 2.0.

The preferred copolymers of the present invention may be represented by the following general formula

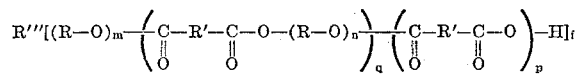

wherein R‴ is the residue attached to the active hydrogens of a polymerization starter R‴ (H)$_f$, and is derived therefrom, which starter is selected from the group consisting of water, hydrogen sulfide, hydrogen-containing inorganic acids and organic compounds having at least one radical selected from the group consisting of hydroxyl, carboxyl, and sulfhydryl radicals, $f$ is the functionality, that is, the number of active hydrogens per molecule, $m$ is an integer varying from zero to about 10, $q$ is an integer with a value ranging from zero to about 100 with the average value of $q$ for the total composition being a number larger than zero, $p$ is an integer with a value of zero or one depending on whether the polymer chains are hydroxyl or carboxyl terminated, with the average value of $p$ being a number ranging from zero to one, and R, R′, and $n$ have the previously assigned meaning. For low equivalent weight compositions the average value of $q$ will vary from at least 0.1, and frequently at least 0.2, to about 0.9; for higher equivalent weight copolymers the average value of $q$ will be at least 1 and seldom more than 100.

The averages of $m$, $n$, and $q$ are arithmetic averages. The average value of $m$ can be computed by summing the number of $-O-R-$ units in the polyether segments attached directly to the starter residues and dividing this sum by the total number of branch chains in the polymer. The average value of $n$ is computed by dividing the sum of the $-O-R-$ units in the polyether segments not attached directly to the starter residues by the number of these polyether segments. The average value of $q$ is computed by summing the number of polyester segments and dividing this sum by the total number of branch chains in the polymer.

In a given copolymer composition the fraction of branch chains having $q$ not equal to zero will generally constitute at least 1/10 and frequently more than 1/2 of the total number of chains. The remainder will be made up of branch chains composed of one or more $-O-R-$ units and of the unreacted active-hydrogen-containing radicals of the original polymerization starter with the latter radicals usually constituting not more than 1/3 of the total members attached to the polymerization starter residues.

The composition of the copolymers of the instant invention may be conveniently determined by hydrolysis or alcoholysis, and identification of the resulting fragments.

The preferred polyester-polyether copolymers prepared according to the novel process of the present invention and represented by the general formula hereinabove may sometimes contain small amounts of polymeric components of a slightly different structure, depending on the reaction conditions and the length of the reaction time, as the result of side reactions. The presence of such side products does not materially affect the properties of the instant copolymers and it is to be understood that the presence of such side products in admixture with the novel polyester-polyether copolymers is within the scope of the present specification and claims. Some high-molecular-weight starters may hydrolyze to lower-molecular-weight fragments under the acidic conditions of the reaction, especially when water is present, and the term polymerization starter residue in the present specification and claims encompasses such lower-molecular-weight products derived from the original starters.

Particularly preferred copolymers are those in which R is a saturated lower aliphatic 1,2-alkylene radical of from two two to six carbon atoms having the formula

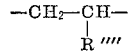

with R″″ being a radical selected from the group consisting of hydrogen, chloromethyl, and lower alkyl radicals, and R′ is selected from the group consisting of saturated and unsaturated lower aliphatic radicals of from 2 to 4 carbon atoms and cyclic hydrocarbon radicals having from six to twelve carbon atoms and from zero to six halogen substituents of the group consisting of chloro and bromo radicals.

Especially preferred are compositions in which R is selected from the group consisting of 1,2-ethylene, 1,2-propylene, 1,2-butylene, and 3-chloro-1,2-propylene, and R′ is selected from the group consisting of ethylene, e.g. $-CH_2-CH_2-$, ethenylene, e.g. $-CH=CH-$, 1,2-phenylene, 3,4,5,6-tetrachloro-1,2-phenylene, 3,4,5,6-tetrabromo-1,2-phenylene, 2,2′-biphenylene, 3,4,5,6-tetrahydro-1,2-phenylene, hexahydro-1,2-phenylene, and 1,4,5,6,7,7-hexachlorobicyclo-(2,2,1)-2,3-heptenylene-5.

If only difunctionally reactive cyclic monoethers and monoanhydrides of polycarboxylic acids are used as reactants, the polymer functionality, that is, the number of hydroxyl or carboxyl end groups per polymer molecule, will be equal to the functionality of the starter. A polymerization starter containing only one hydroxyl or carboxyl group will give rise to a polymer molecule composed of a single polymer chain terminated by a hydroxyl or carboxyl group, a difunctional starter, such as a glycol, will produce compositions comprised of polymer molecules having two main polymer chains emanating from the starter residue, and with a triol, such as glycerol, as starter, the polyester-polyether copolymer will be comprised of polymer molecules having three hydroxyl- or carboxyl-terminated polymer chains attached to the starter, and so on. Thus, if sorbitol is employed as starter the polyester-polyether copolymer will be hexafunctional, if pentaerythritol is used the polymer functionality will be four, and so on. When a single polymerization starter is used, the functionality of the polyols of the instant invention is thus essentially uniform and equal to that of the polymerization starter used, so that the selection of the polymerization starter allows an effective control over and affords a wide choice of the polyol functionality. If a mixture of starters is used, the resulting polyol will have an effective average functionality which can be estimated from the individual functionalities and the proportions of the various starters. The number-average functionality, $\bar{f}$, of a mixture of Starter 1 and Starter 2 may be computed as follows:

$$\bar{f} = \frac{(\text{Mols of 1}) \times (\text{functionality of 1}) + (\text{Mols of 2}) \times (\text{functionality of 2})}{\text{Mols of 1} + \text{Mols of 2}}$$

For example, sorbitol monohydrate has an average functionality of $(2+6)/2=4.0$, dextrose monohydrate has an average functionality of $(2+5)/2=3.5$, and a sucrose solution containing three mols of glycerol per mol of saccharide has an average functionality of 4.25.

By coupling together two chains of such a multifunctional polymer molecule it is possible to convert it into a higher molecular weight polymer of still higher functionality and degree of branching, than that implied by the starter molecule employed. For example, a trifunctional polymer can be converted into a hexafunctional polymer, or a tetrafunctional-starter-derived polymer into an octafunctional coupling product, and so on. Increasing the polymer functionality in the fashion outlined is accomplished through the use in combination with the other reactants of relatively small amounts of compounds having more than one epoxide or anhydride group. Thus, if a diepoxide is used in the amount of one mol per two mols of starter employed, the average result is that the diepoxide essentially couples together two polymer molecules giving a theoretical molecular weight and degree of functionality about twice as high as would be the case if only a cyclic monoether were used. If a triepoxide is employed each molecule of such epoxide used results in the coupling together of three polymer molecules into one assembly. This increase in functionality is realized without impairing the thermoplastic, fusible nature of the resulting polymers. Thus a slightly modified embodiment of the process of this invention contemplates the use of small amounts of polyepoxides and polyanhydrides, in particular diepoxides and cyclic dianhydrides, in combination with the other reactants. Clearly the amount of such polyfunctional reactants used must be kept quite low as crosslinking and gelation will otherwise result. Thus, if polyfunctional reactants, such as dianhydrides or diepoxides are used, they must be employed in amounts small enough to avoid gelation. The allowable amount depends on the specific reactants selected. If too much of the polyfunctional reactant is used and an unwanted increase in viscosity or gelation results, the amount has to be decreased in subsequent preparations. The amount of polyfunctional reactant which may be used is generally not in excess of one mol per mol of starter employed, and varies from about 1% to not more than about 20 percent by weight of the total reactant mixture. Whenever small amounts of such a polyfunctional reactant are employed, the resulting polymer will have a more complex structure than the structure described herein for the polymers prepared with monocyclic ethers and monoanhydrides only, and this fact should be taken into account.

In sharp contrast to compositions prepared by normal, prior art polycondensations the total molecular weight, the equivalent weight, and the average functionality of the copolymers of this invention depend only on the nature and the quantities of starting materials used. This allows an important amount of control over the product structure not previously possible. The relative proportion of ether and ester linkages and the length of the polyether segments is additionally determined by the reaction conditions. The simplest and most definitive description of these novel products is made by reference to the average degree of polymerization of the polyether segments present in the polymer. In the case where the ether segment connects two ester functions within the chain this can be considered to be the average number of cyclic ether residues linked together between two ester functions:

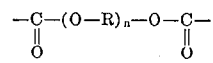

where R is a hydrocarbon residue from an epoxide or oxetane as herein-described and $n$ is the average degree of polymerization in the polyether segment. The numerical value of $n$ is equal to the number of ether oxygens plus one, conversely, the number of ether oxygens present in a segment is equal to $n$ minus one. It should be noted, however, that cyclic ether may be added to a hydroxyl group situated in such a position that ester functions are not present at both ends of the polyether segment. For example, if a polymer chain is terminated by a hydroxyl group, the polyether chain segment is the following:

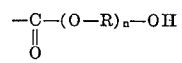

wherein R and $n$ have the assigned meaning, and $n$, the degree of polymerization, is equal to the number of cyclic ether residues linked together between the terminal hydroxyl group and the ester function. Also, polyether chain segments may be built on each hydroxyl group present at the start of the polymerization reaction: $R''-(O-R)_{m-1}-OH$. Herein R has the assigned meaning, $m$ is the degree of polymerization in the initial polyether segment, and $R''$ is the residue from a hydroxyl-radical-containing polymerization starter. In this case the original starter residue contributes a value of unity to the degree of polymerization of the polyether segment. This is made clear by noting that the number of ether oxygens present in the polyether segment is equal to the number of cyclic ether residues, and that the number of distinct cyclic ether residues is taken to be the degree of polymerization of the polyether segment minus unity. In sulfhydryl starters, the initial linkage is of course a thioether linkage. With regard to the degree of polymerization in the polyether segment the thioether sulfur is treated in this specification as if it were oxygen.

The varying length of the polyether segments in the products of this invention can be illustrated by products formed using the epoxide propylene oxide as the cyclic ether. If the average degree of polymerization of the polyether segments is 2.5, then the polymer actually contains relatively large amounts of monopropylene glycol, dipropylene glycol and tripropylene glycol, as ether segments. Smaller amounts of tetrapropylene glycol, pentapropyene glycol and higher polypropylene glycol ether segments are also present, the amount rapidly decreasing with molecular weight of the polyether glycol segments.

The degree of polymerization of the polyether segments is dependent on the relative concentrations of cyclic ether, anhydride, hydroxyl, and acid groups present in the reaction mixture. The actual relationship is an involved and complicated integrated reaction rate expression. However, it has been found that a very approximate working relationship exists between the average degree of polymerization in the polyether segments and the average ratio of equivalents of cyclic ether present per sum of equivalents of acid groups present plus one-half the equivalents of anhydride present in the reaction mixture. Herein one equivalent of cyclic ether is taken to be one mole of cyclic ether, one equivalent of acid group is equal to one mole of acid group and one mole of anhydride equals two equivalents. This relationship is necessarily quite approximate, encompassing at it does all epoxides and oxetanes, all anhydrides, and all reaction systems and conditions. However, for purposes of preliminary design of reaction systems, the ratio, W, defined as $$W = \frac{\text{Equivalents of Epoxide}}{\text{Equivalents of Acid} + \tfrac{1}{2}(\text{Equivalents of Anhydride})}$$

may serve as an approximate working guide. If this ratio is vanishingly small and approaches zero during essentially the entire course of the polymerization, the conditions necessary for the preparation of a simple ordinary polyester, which has an average degree of polymerization of unity, are met. When the above ratio is very large the average degree of polymerization in the polyether segments will be relatively high and theoretically this would represent conditions for the preparation of a pure polyether containing virtually no ester groups.

The average degree of polymerization in the polyether segments is primarily determined by the ratio of equivalents of cyclic ether to the sum of the equivalents of acid plus one-half of the equivalents of anhydride employed in the reaction, provided that all of the reactants are combined initially. If reactants are added stepwise, in several sizable portions, then the process may be considered to be a series of interdependent reactions, and identical amounts of reactants can result in products differing somewhat, depending on the precise mode of combination of the reactants. The average degree of polymerization may be slightly reduced, if the starter, the anhydride and a substantial portion of the epoxide are combined initially, and the remainder of the epoxide is added in several sizable batches during the course of the polymerization. It should be clearly emphasized, however, that the copolymers of this invention cannot be produced, if the polymerization is run under such conditions that the cyclic ether concentration is always very low—that is, if the epoxide is added dropwise to the reaction mixture—then the effective ratio of epoxide to acid plus anhydride is always near zero, and the average degree of polymerization of the ether is essentially unity. Under such conditions the product obtained is essentially a pure polyester with at most a vanishingly small proportion of ether linkages present. It should be understood therefore that to obtain the copolymers of this invention, any batchwise additions of epoxide have to be made in such a manner as to comprise a few sizable portions. The degree of polymerization in the polyether segment can be increased slightly, if the polymerization starter, the cyclic ether and a portion of the cyclic anhydride are combined initially and the remainder of the anhydride is added in several sizable batches during the course of the polymerization. It is not readily possible, however, to prepare an essentially pure polyether in this manner, since the cyclic anhydride not only provides the acid groups required to promote the addition of cyclic ether to hydroxyl groups to form polyether segments, but also reacts to form ester linkages, and there seems to be a limiting length of polyether segment formed even when the anhydride is added in small increments.

Regardless of which mode of operation is preferred in a particular instance, the entire amount of polymerization starter should advisably be present at the start of the reaction. If the starter were added in several portions, rather than all being present initially a broadening of the molecular weight distribution would result, and this is generally undesirable. The same effect occurs to a smaller extent when the starter is poorly soluble, and dissolves only slowly in the mixture of the other reactants.

It should be clearly understood that the ratio of epoxide to anhydride employed has no significance in itself in determining the average degree of polymerization of the polyether segments present in the polymer. If not all of the epoxide employed is reacted because of any volatilization losses, because of the presence of strongly basic substances, or because of incomplete reaction, then only the actual amount reacted is combined in the polymer. To be specific, consider the polymerization of phthalic anhydride, propylene oxide or 1,2-butylene oxide with a carboxylic acid starter to produce a chiefly hydroxyl-terminated polymer. If conditions are chosen so as to give complete reaction of all starting materials, and all of the reactants are added at once, then the required ratio of epoxide to acid plus anhydride is approximately two to three, and the average degree of polymerization in the polyether segments is about 2.0 to 2.5. For the same system but in which acid end groups are desired, the required ratio, W, of epoxide to acid plus anhydride is lowered to about 1.5 to 2.0, and the average value of $n$ is not materially changed. Similar results are obtained for hydroxyl-group-containing starters, if it is considered that polyether segments may be attached directly to the starter through the hydroxyl oxygen, and that the starter adds a value of unity to the degree of polymerization in each such polyether segments. An additional amount of epoxide is employed in this latter case to react with the hydroxyl groups to form any initial polyether segments. Analogous considerations apply to sulfhydryl-group-containing starters which can form a thioether linkage initially. When ethylene oxide or oxetane are used in place of propylene oxide the average degree of polymerization of the polyether segments increases to approximately 2.5 to 3.5, and the required ratio, W, increases accordingly.

An exact calculation of the average degree of polymerization of the polyether segments, $n_{av.}$, for copolymers started by OH or SH radicals is difficult since it has to take into account any polyether segments of variable length which are attached directly to the starter residue. By neglecting the polyether segments attached directly to the starter residue an approximate value of $n_{av.}$ can be readily estimated by dividing the mols of chemically combined cyclic ether units by the mols of those combined anhydride residues which were not used to form terminal carboxylic acid groups. Such approximate values constitute an upper limit and the actual values will generally be somewhat lower.

In carboxylic-acid-started polymers the exact average degree of polymerization of the polyether segment can easily be calculated, however, by dividing the total number of mols of combined cyclic ether residues by the following denominator—number of equivalents of acid starter plus total number of mols of anhydride residues minus number of mols of anhydride residues which formed carboxylic acid end groups.

The molecular weight of these copolymers may vary over a wide range of values and will depend on the quantities and nature of reactants employed. The molecular weight of the polymer is calculated by dividing the total weight of polymer by the mols of starter employed, provided that no coupling or side reactions occur. There appears to be no upper limit of the molecular weights which can be achieved and molecular weights as high or as low as desired may be obtained. Compositions of interest will generally have molecular weights varying from at least 200 and preferably about 300 and frequently at least 500 to not more than about 50,000, and frequently to not more than 30,000. Higher molecular weights can be obtained, however, if desired, and molecular weights in the range of 100,000 to 1 million have been obtained. The minimum molecular weights are represented by polymers consisting of a starter residue, about one anhydride residue and cyclic ether residues in an amount such that the average degree of polymerization in the ether linkage is at least 1.50. The amount of cyclic ether necessary to achieve this average degree of polymerization is not constant value but will vary with the specific reactants and reaction conditions used. High molecular weight copolymers generally will have minimum molecular weights of at least 1000, and frequently at least 1500.

The novel copolymers of this invention are further distinguished from prior art compositions, in particular those produced by polycondensation techniques, by having a relatively narrow molecular weight distribution, that is, the difference in molecular weight between individual polymer molecules are relatively small. For compositions produced according to the preferred embodiment of the present invention the ratio of the weight-average molecular weight, $\overline{M}_w$, to the number-average molecular weight, $\overline{M}_n$, e.g. $\overline{M}_w/\overline{M}_n$, is generally less than 1.5, and frequently less than 1.3, if a single polymerization starter is employed. Compositions produced from a mixture of polymerization starters of different functionality will have a somewhat broader total average molecular-weight distribution, with the ratio $\overline{M}_w/\overline{M}_n$ of the copolymer fractions derived from the individual starter components, however, being less than 1.5.

Under theoretical conditions ring-opening polymerizations generally lead to polymers with molecular-weight distributions of a type referred to as Poisson-type which are much narrower than the distributions of the geometric type characteristic of polymers produced by polycondensation processes. These fundamental differences in molecular-weight distribution are important since they manifest themselves in differing viscosity properties of the two types of polymers. Although the polymers of this invention are relatively much more homogeneous than condensation polymers, there is some variability in the product with respect to both molecular weight and composition. At relatively high molecular weights such as in copolymers containing residues of about ten anhydrides and thirty cyclic ethers attached to a starter residue the variation in composition and molecular weight of the individual molecules is sligh, but it becomes more pronounced at very low molecular weight.

The physical state of these polymers at room temperature varies from viscous liquids to glassy solids. These copolymers are, however, of much lower viscosity and tend to be considerably less glassy in nature than ordinary polyesters containing the same cyclic ether residue and anhydride residue. Many of the present copolymers have a viscosity as measured at 25° C. in a Brookfield or similar vicosimeter of less than 200,000 centipoises, and frequently less than 100,000 centipoises, and sometimes less than 20,000 centipoises. The present copolymers are of better quality than prior art polymers since the process of this invention avoids the slow reactions and resulting degradation involved in other processes. The milder reaction conditions result in improvd polymer appearance, e.g. lighter color.

The polyether-polyester products produced by the present invention have a narrow molecular-weight distribution, and this is reflected in their relatively low viscosity. The present invention yields high-molecular-weight, high-functionality, branched polymers which are still soluble and fusible, and which have a moderate viscosity, facilitating their handling. Either the molecular weight or the functionality of prior art products was reduced, or else the products were extremely viscous or gelled.

The randomness of the copolymer structure and the flexibility provided by the polyether segments result in several advantages. Owing to the randomness of their structure these copolymers of the present invention tend to be amorphous and do not readily crystallize. This property is particularly advantageous when it is desired to use the compositions of the present invention as reaction intermediates, or for any other purpose where the polymer should not crystallize on standing. In contrast to the present copolymers ordinary aliphatic polyesters derived from aliphatic anhydrides and cyclic ethers tend to be crystalline.

The polyester-polyether copolymers of the present invention are useful as polymeric plasticizers and in detergent formulations. The instant copolymers are also very useful as components and intermediates in the formation of a wide variety of polymeric compositions. The high-molecular weight polymers of high functionality provided by the present invention are highly desirable in preparing various products, such as low density polyurethane foams, urethane coatings and elastomers and unsaturated laminating and casting resins.

Hydroxyl-terminated polyester-polyether copolymers can be reacted with polyisocyanates, such as tolylene diisocyanate, to form novel polyurethane compositions of improved toughness and flexibility. Especially useful for the preparation of rigid polyurethane foams are compositions having equivalent weights ranging from about 90 to about 1500 and having the general formula

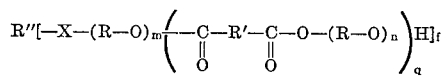

wherein R" is the starter residue attached to the active-hydrogen-containing radicals of a starter $R''(XH)_f$, or derived therefrom, X is a divalent oxygen or sulfur radical, e.g., —O— or —S—; $f$, the functionality, is an integer having a value of at least three and preferably at least four, R is 1,2-propylene, 1,2-butylene, or 1,2-ethylene, R' is a cyclic hydrocarbon radical of from six to twelve carbon atoms and from zero to six halogen substituents selected from the group consisting of chloro and bromo radicals, and $m$, $n$ and $q$ have the previously assigned meaning.

Desirable flexible polyurethane compositions can be produced from polyisocyanates and polyether-ester copolymers with equivalent weights ranging from 300 to 3000 and having the general formula

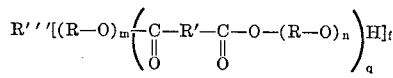

wherein R''', $m$, $n$ and $q$ have the previously assigned meaning, $f$ is an integer having a value of at least two and usually less than eight, R is 1,2-propylene, 1,2-butylene, or 1,2-ethylene, and R' is selected from the group consisting of lower aliphatic divalent hydrocarbon radicals, e.g. —CH$_2$—CH$_2$— or —CH$_2$—CH$_2$—CH$_2$—, and cyclic hydrocarbon radicals of from six to twelve carbon atoms and from zero to six halogen substituents selected from the group consisting of chloro and bromo radicals.

The flexible, aliphatic segments provided by the polyether segments in these copolymers are particularly advantageous in the preparation of flexible, tough laminating and casting resins. Thus, the unsaturated polyether-polyester copolymers prepared from maleic anhydride and propylene or ethylene oxide can be combined with unsaturated monomers, such as styrene, substituted styrenes, methyl methacrylate, diallyl phthalate and triallyl cyanurate, and a free-radical initiator to form a variety of very useful cross-linked compositions. Polyester-ether copolymers useful in this application have molecular weights ranging from 1500 to 20,000 and may be represented by the general formula

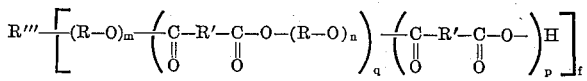

wherein R''', $m$, $n$, $q$, and $p$ have the previously assigned meanings, $f$ is an integer with a value ranging from one to six, and preferably is two, R is selected from the group consisting of 1,2-ethylene, 1,2-propylene, and 1,2-butylene, and R' is composed of from 25 to 100 mol percent of ethylenically unsaturated lower aliphatic hydrocarbon radicals, such as —CH=CH— and

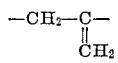

and from zero to 75 mol percent of cyclic hydrocarbon radicals having from six to twelve carbon atoms and from zero to six halogen substituents selected from the group consisting of chloro and bromo radicals, such as 1,2-phenylene, 3,4,5,6-tetrachloro-1,2-phenylene, 3,4,5,6-tetrabromo-1,2-phenylene, and others.

Carboxylic-acid terminated copolymers with equivalent weights ranging from 100 to 1000 are useful in combination with epoxy resins to form cross-linked resinous compositions. Especially useful are copolymers of the general formula

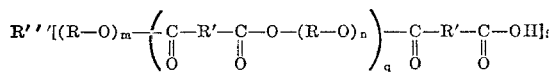

wherein $m$, $n$, $q$, and $R'''$ have the previously assigned meanings, $f$ is an integer varying from two to six, R is selected from the group consisting of 1,2-ethylene, 1,2-propylene, and 1,2-butylene, and R' is selected from the group consisting of 1,2-ethenylene, e.g. —CH=CH—, and cyclic hydrocarbon radicals having from six to twelve carbon atoms and from zero to six halogen substituents selected from the group consisting of chloro and bromo radicals.

Useful air-drying compositions can be prepared by esterifying carboxyl-terminated or hydroxyl-terminated polyester-polyether copolymers with unsaturated hydroxyl- or carboxyl-functional compounds having air-drying properties. For example, useful novel medium and short-oil length resins are prepared from the copolymers of the present invention and unsaturated compounds selected from the group consisting of unsaturated fatty acids, such as linoleic acid, linolenic acid, dehydrated castor oil fatty acids, oleic acid, erucic acid, drying-oil fatty acids derived from vegetable and marine oils, such as linseed oil, castor oil, soybean oil, cottonseed oil, and tung oil, fatty acid half esters, unsaturated alcohols, such as allyl alcohol, and unsaturated ethers of polyhydric alcohols, such as the monoallyl and diallyl ethers of trimethylolpropane.

The following examples are presented to illustrate, but not to restrict, the invention:

EXAMPLE 1

This example illustrates the one-step reaction of a cyclic anhydride and an epoxide, together with a compound having active hydrogens to give a polyester containing polyether segments.

Phthalic anhydride (72.7 grams), propylene oxide (30.6 grams) and glycerol (18.9 grams) are sealed in a heavy-walled glass tube. The contents are thoroughly mixed by shaking and the tube is placed in an oven. The reaction mixture is held at 105° C. for 70 minutes, then at 130° C. for 50 minutes, then at 150° C. for 40 minutes, and then at 170° C. for 150 minutes. The product is viscous. After cooling, the material is extremely viscous, and has an acid number of 160. There is no evidence of either free anhydride or free epoxide. The polymer remains fusible, thermoplastic and easily soluble in methyl ethyl ketone even after heating for 48 hours at 195° C., and is colorless.

EXAMPLE 2

This example illustrates the one-step reaction of phthalic anhydride, propylene oxide, and glycerol to give a polymer containing ether and ester linkages at random, and having a low acid number.

Phthalic anhydride (48.7 grams), propylene oxide (54.1 grams) and glycerol (10.1 grams) are sealed together in a heavy-walled glass tube. The tube is then thoroughly shaken to mix the components, and placed into an oven. The tube is held at 110° C. for 30 minutes, 142° C. for 50 minutes, and 157° C. for 30 minutes. The cooled polymer is very viscous, but fluidizes at a slightly elevated temperature. The polymer evolves the unreacted propylene oxide on heating in the oven. It remains thermoplastic and soluble in acetone and undergoes no noticeable change in viscosity after heating for 36 hours at 200° C. The polymer is colorless.

This polymer is calculated to contain a large number of ether linkages, and is a phthalic polyester of mixed propylene and polypropylene glycols, glycerol, and mixed adducts of propylene oxide and glycerol.

EXAMPLE 3

This example again illustrates the uncatalyzed reaction of phthalic anhydride, propylene oxide, and glycerol to give a mixed polyether-polyester.

Phthalic anhydride (41.1 grams), propylene oxide (55.4 grams) and glycerol (12.3 grams) are placed together into a thick-walled glass tube which is then sealed. The tube is thoroughly shaken to mix the contents and is then placed into an oven. The tube is heated at 105° C. for 20 minutes, 127° C. for 25 minutes, 155° C. for 45 minutes, 168° C. for 40 minutes, and 178° C. for 30 minutes. The hot polymer is fluid, and some unreacted propylene oxide condenses in the top of the tube on cooling. The polymer is fairly viscous when cool and has an acid number of 8. To prevent loss of unreacted epoxide the reaction tube is opened only after cooling, care being taken to assure that most of the unreacted epoxide remains in the polymer. The tube is resealed and reheated at 170° C. for 100 minutes. The polymer becomes much more viscous and has an acid number of less than 2.

EXAMPLE 4

This example illustrates the preparation of a higher-molecular weight randomly mixed polyether-polyester from phthalic anhydride, propylene oxide and glycerol.

Phthalic anhydride (52.8 grams), propylene oxide (61.9 grams) and glycerol (2.9 grams) are placed together into a heavy-walled glass tube and the tube is then sealed. The tube is thoroughly shaken to mix the contents, and it is then heated for 30 minutes at 115° C., 170 minutes at 121° C., 35 minutes at 149° C. and 100 minutes at 176° C. The polymer is very viscous when cold, but is not glassy. There is a little unreacted propylene oxide present, and the acid number is about 2.5. The polymer is colorless.

EXAMPLE 5

This example illustrates the preparation of a mixed polyester-polyether from phthalic anhydride, 1,2-butylene oxide, and glycerol.

Phthalic anhydride (40.9 grams), 1,2-butylene oxide (55.8 grams) and glycerol (12.4 grams) are placed together into a heavy-walled glass tube which is then sealed. The tube is thoroughly shaken to mix the contents, and it is then heated at 113° C. for 70 minutes. The tube is then shaken again until the contents are homogeneous, and heated at 173° C. for 280 minutes. The polymer is very viscous on cooling and shows no evidence of unreacted epoxide. The acid number is about five.

This polymer is a polymeric ester of phthalic acid, 1,2-butylene glycol and polybutylene glycols, glycerol, and mixed adducts of 1,2-butylene oxide and glycerol.

EXAMPLE 6

This example illustrates the preparation of a mixed polyester-polyether having a higher functionality, by reacting together phthalic anhydride, propylene oxide, and sorbitol.

Phthalic anhydride (43.7 grams), propylene oxide (50.5 grams), and 6.6 grams of sorbitol are placed into a heavy-walled glass tube, and the tube is then sealed. The tube is heated for 40 minutes at 120° C., and the sorbitol melts, but forms a dense second liquid phase. The tube is further heated at 132° C. for 20 minutes and at 148° C. for 60 minutes, with shaking at intervals. At this point the sorbitol has all dissolved, and the tube is then heated at 167° C. for four hours. The polymer is fluid when hot, and the hot polymer evolves unreacted epoxide when the pressure is released by opening the tube. The acid number is about two, and the cold polymer is quite viscous and is colorless.

EXAMPLE 7

This example illustrates the preparation of a linear unsaturated mixed polyether-polyester from phthalic anhydride, maleic anhydride, propylene oxide and propylene glycol.

Phthalic anhydride (21.0 grams), maleic anyhdride (12.1 grams), propylene oxide (49.1 grams), and propylene glycol (3.2 grams) are placed together into a thick-walled glass tube and the tube is sealed. The tube is then heated at 120° C. for 70 minutes, and the tube is then shaken until the contents are homogeneous. The tube is then further heated at 140° C. for 50 minutes, and at 163° C. for 240 minutes. The polymer is of a bright yellow color, and has an acid number of 36. Considerable unreacted epoxide is present. During cooling the tube is frequently shaken, so that the epoxide does not segregate, and the tube is opened only after thorough cooling so that the unreacted epoxide does not escape. In order to further react the epoxide, the tube is resealed and reheated at 163° C. for 115 minutes. The acid number is now 15, and unreacted epoxide is still present.

The tube is once more resealed and reheated at 160° C. for 120 minutes. The acid number is now 8.

EXAMPLE 8

This example illustrates the preparation of a saturated mixed polyether-polyester by the reaction of succinic anhydride, porpylene oxide and sorbitol.

Succinic anhydride (44.9 grams), propylene oxide (61.1 grams), and sorbitol (8.5 grams) are placed into a thick-walled glass tube, and the tube is sealed. The tube is then thoroughly shaken, and heated at 130° C. for 40 minutes and for 80 minutes at 143° C. The molten sorbitol phase has dissolved by this time, and the tube is again thoroughly shaken to insure homogeneity. The reaction mixture is now heated at 154° C. for 30 minutes, and at 159° C. for 105 minutes. The polymer at the end of this heating period still contains unreacted epoxide and has an acid number of 35.

Since the polymer is thoroughly cooled before opening the tube, the unreacted epoxide is substantially retained, and the tube is resealed and heated at 182° C. for 80 minutes. The acid number is now 18, and only a small amount of unreacted epoxide is still present.

EXAMPLE 9

This example illustrates the preparation of a polyether-polyester from Chlorendic anhydride, propylene oxide and glycerol.

Chlorendic anhydride (52.8 grams), propylene oxide (20.9 grams), and glycerol (5.2 grams) are placed into a thick-walled glass tube and the tube is sealed. The tube is thoroughly shaken, and then heated at 132° C. for 28 minutes. The tube is then shaken until the contents are homogeneous, and is then further heated at 132° C. for 17 minutes. The hot polymer is light golden brown in color, and a small amount of volatile unreacted epoxide is present. The acid number is 4. The reaction has proceeded very fast, and the color of the product is excellent for a Chlorendic polyester.

EXAMPLE 10

This example illustrates the preparation of a light-colored polyether-polyester from Chlorendic anhydride, propylene oxide and glycerol.

Chlorendic anhydride is recrystallized by dissolving the commercial material in hot toluene and allowing the purified material to crystallize out on cooling to room temperature. The pure crystals are filtered with suction and dried in air until the odor of toluene is no longer discernible.

The recrystallized Chlorendic anhydride (48.0 grams), propylene oxide (18.8 grams), and glycerol (3.9 grams) are placed together into a heavy-walled glass tube which is then sealed. The sealed tube is thoroughly shaken and then heated at 107° C. for 10 minutes. The tube is shaken again until the contents are homogeneous, and is further heated at 107° C. for 40 minutes. At this point the polymer is a viscous liquid with a pale honey color. There is no evidence of volatiles present, and the acid number is about 1½.

EXAMPLE 11

This example illustrates the preparation of a polyether-polyester from phthalic anhydride, pyromellitic dianhydride, propylene oxide and glycerol.

Phthalic anhydride (48.1 grams), pyromellitic dianhydride (4.4 grams), propylene oxide (60.8 grams), and glycerol (5.9 grams) are placed together into a heavy-walled tube and the tube is then sealed. The contents are thoroughly mixed by shaking, and the tube is then heated at 118° C. for 30 minutes, and the tube is then again shaken until the contents are homogeneous. The homogeneous reaction mixture in the tube is then heated further at 131° C. for 20 minutes, at 139° C. for 45 minutes, at 152° C. for 35 minutes, and at 177° C. for 65 minutes. At the end of this heating period there is some volatile unreacted epoxide present, and the acid number of the polymer is 11. A slightly longer reaction period should be used in order to complete the reaction of the epoxide and lower the acid number. This polymer is viscous when cold.

EXAMPLE 12

This example illustrates the preparation of a mixed polyether-polyester from phthalic anhydride, trimellitic anhydride, propylene oxide and glycerol.

Phthalic anhydride (26.3 grams), trimellitic anhydride (16.2 grams), propylene oxide (58.1 grams), and glycerol (3.9 grams) are placed into a heavy-walled glass tube and the tube is sealed. The tube is shaken vigorously, and then heated at 121° C. for 35 minutes. After this initial heating period the tube is again shaken vigorously until the contents become homogeneous. The reaction mixture is then heated further at 132° C. for 30 minutes, 146° C. for 40 minutes and 159° C. for 20 minutes. The polymer is a pale yellow color. The contents are occasionally mixed while the tube is being cooled so as to prevent segregation of volatile epoxide. When thoroughly cold the tube is opened. There is some pressure present, indicating the presence of unreacted epoxide. The acid number is 19, and the polymer is colorless.

Since unreacted epoxide is present, and is not lost from the cold polymer, the tube is resealed, and the polymer heated again for six hours at 159° C. When the tube is opened while still hot no volatiles escape. The acid number at this point is 11.

EXAMPLE 13

This example illustrates the preparation of a hexafunctional, hydroxyl-terminated polyether-polyester having a very high molecular weight by the reaction of phthalic anhydride, propylene oxide and sorbitol.

Phthalic anhydride (46.0 grams), propylene oxide (48.8 grams), and sorbitol (2.8 grams) are sealed together in a heavy-walled tube. The tube is then heated for 20 minutes at 174° C., the sorbitol first melting to form a denser second liquid phase, and then dissolving. The tube is then heated at 174° C. for an additional 125 minutes. The product is quite viscous at oven temperature, and almost immobile at room temperature. The acid number is 2.5.

EXAMPLE 14

This example illustrates the preparation of a mixed polyester-polyether from phthalic anhydride, propylene oxide, and glycerol using a continuous process.

The apparatus consists of a coil of 316 stainless steel tubing, 143 ft. in length, having an inside diameter of ¼ inch, immersed in a glycerol bath maintained at a constant temperature by means of a heater and thermostat. The inlet of the tube is a T joint leading to two small reciprocating pumps capable of delivering small flows at high pressure. Both pumps have an adjustable stroke so that the delivery rate can be varied. The outlet of the tube is a high-pressure valve.

Molten phthalic anhydride is fed to one pump at about 160° C. and the cylinder of the pump is heated by an electrical resistance coil so that the anhydride does not freeze in the cylinder. The other pump is fed a 9.3% solution of glycerol in propylene oxide. The pump delivering the phthalic anhydride has been adjusted to deliver 146 grams per hour of the molten material. The pump delivering the glycerol-propylene oxide solution has been adjusted to deliver 186 grams per hour.

To start the process, the coil is brought to a temperature of 177° C., and the outlet valve opened slightly. The tube is then run full of phthalic anhydride, and the valve adjusted so that the back pressure at the outlet end is about 200 pounds per square inch. The other pump is then started and the system allowed to approach steady state. After about 3 to 4 hours, the pressure at the outlet valve begins to rise, and the valve is further opened, so that the outlet pressure does not exceed 400 pounds per square inch. After a total of ten hours since starting the second pump, the outlet pressure has become quite constant, indicating that a steady state has been reached. The hot polymer issuing from the outlet froths, indicating that there is excess epoxide present. The acid number of the polymer is about 2, and the polymer is nearly colorless.

The calculated reaction time, based on an assumed average melt density of 1.0, is about four hours.

EXAMPLE 15

This example illustrates the preparation of a nearly colorless polyester-polyether of Chlorendic acid.

Chlorendic anhydride is recrystallized three times from hot toluene. The product from the third recrystallization is in the form of large, colorless crystals. This material (30.5 grams), and glycerol (2.3 grams), and propylene oxide (13.3 grams), is sealed into a heavy-walled glass tube. The tube is shaken by hand, and then placed in an oven. The tube is heated at 78° C. for 10 minutes, and the contents then mixed by shaking until the mixture is homogeneous. The tube is then heated at 78° C. for an additional 95 minutes.

The product is a viscous, clear, slightly colored fluid, resembling white corn syrup. The acid number is 2½, and a small amount of unreacted propylene oxide is present.

EXAMPLE 16

This example illustrates the preparation of a polyester-polyether from endo-cis-bicyclo-(2,2,1)-5-heptene-2,3-dicarboxylic acid anhydride.

Endo - cis - bicyclo - (2,2,1) - 5 - heptene - 2,3 - dicarboxylic acid anhydride (32.8 grams), glycerol (5.5 grams), and propylene oxide (28.8 grams), are sealed together in a thick-walled glass tube. The tube is heated at 105° C. for 20 minutes, and the contents mixed by shaking the tube. The tube is then further heated for 50 minutes at 105° C., 55 minutes at 120° C., 30 minutes at 144° C., 250 minutes at 168° C., and 390 minutes at 163° C. The product is a viscous, pale yellow-orange fluid with an acid number of 6½. There is a small amount of unreacted epoxide present.

EXAMPLE 17

This example illustrates the preparation of a mixed polyether-polyester from phthalic anhydride and propylene oxide, using a mixture of glycerol and phosphoric acid as the starter. This polymerization proceeds more rapidly than one in which no phosphoric acid is used.

Phthalic anhydride (43.2 grams), glycerol (4.0 grams), propylene oxide (46.9 grams), and 85% phosphoric acid (0.9 gram) are sealed together in a thick-walled glass tube. The tube is heated at 123° C. for 15 minutes, and the contents then mixed by shaking. The tube is then further heated at 123° C. for 20 minutes and at 139° C. for 275 minutes. The product is a viscous fluid having an acid number of four. A small quantity of unreacted epoxide is still present.

EXAMPLE 18

This example illustrates the preparation of mixed polyether-polyester from maleic anhydride, phthalic anhydride, and propylene oxide, using 85% phosphoric acid as starter. This reaction proceeds much more rapidly than a similar one in which glycerol is substituted for the phosphoric acid.

Maleic anhydride (11.1 grams), phthalic anhydride (16.0 grams), propylene oxide (34.5 grams) and 85% phosphoric acid (2.6 grams) are sealed together in a thick-walled glass tube. The contents begin to heat up when mixed, because of the reaction between the phosphoric acid and the epoxide. The reaction mixture is then heated at 138° C. for 10 minutes, and the contents then mixed by shaking the tube. The tube is then heated for an additional 75 minutes at 138° C. The product is a viscous, pale yellow fluid having an acid number of 27. A small amount of unreacted epoxide is still present.

EXAMPLE 19

This example illustrates the preparation of a mixed polyether-polyester from phthalic anhydride, trimethylene oxide and glycerol.

Phthalic anhydride (2.0 grams), trimethylene oxide (2.3 grams) and glycerol (0.4 gram) are sealed together in a small glass bomb tube. The mixture is placed in an oven heated to 162° C. After five minutes the tube is shaken until the contents become a homogeneous fluid, and the tube is replaced in the oven. After thirty additional minutes in the oven, the contents of the tube has become considerably viscous. After a total of 70 minutes in the oven, the tube is removed. The resulting polymer is quite viscous when cold, and has an acid number of 32.

EXAMPLE 20

Dextrose monohydrate (0.41 gram), water (0.09 gram), phthalic anhydride (2.45 grams) and propylene oxide (2.7 grams) are combined and heated at 155° C. under autogenous pressure in a closed vessel with stirring for a period of 80 minutes. The resulting homogeneous polymeric product has a pale golden color, contains no unreacted propylene oxide and has a viscosity of about 10,000 centipoises at room temperature.

EXAMPLE 21

Xylose (0.49 gram), phthalic anhydride (2.1 grams) and propylene oxide (2.5 grams) are combined and heated together with stirring in a closed vessel under autogenous pressure for a period of one hour at 145° C., and then for two hours at 155° C. The homogeneous polymeric product is dark golden in color and has a viscosity of about 10,000 centipoises at room temperature.

EXAMPLE 22

Raffinose pentahydrate (0.50 gram), phthalic anhydride (2.2 grams) and propylene oxide (2.25 grams) are combined and heated together in a closed vessel under autogenous pressure at 130° C. with stirring for one hour and for 135 minutes at 150° C. The polymeric product has a golden color. The viscosity of the polymer at room temperature is in excess of 100,000 centipoises.

EXAMPLE 23

Anhydrous sorbitol (1.21 grams), water (0.40 gram), phthalic anhydride (4.4 grams) and propylene oxide (5.2 grams) are combined and heated at 141° C. under autogenous pressure with stirring for a period of 60 minutes in a closed vessel. The product is a glass-clear, colorless polymer which has a viscosity of about 70,000 centipoises at room temperature.

EXAMPLE 24

Maltose monohydrate (1.69 grams), water (0.19 gram), phthalic anhydride (3.6 grams), and propylene oxide (6.5 grams) are combined and sealed into a thick-walled glass tube. The mixture is heated with vigorous shaking for a period of 330 minutes at a temperature of 154° C. The sugar melts and dissolves gradually over a period of 90 minutes. The polymeric product formed has a golden brown color and an acid number of about 0.8. The viscosity at room temperature is approximately 10,000 centipoises.

EXAMPLE 25

Oleic acid (2.65 grams), phthalic anhydride (1.8 grams) and propylene oxide (3.0 grams) are combined and heated under autogenous pressure at 150° C. for a period of five hours in a closed vessel with good agitation. The resulting polymer is yellow in color and has a viscosity of about 1000 centipoises at room temperature, and has an acid number of seven.

EXAMPLE 26

Dextrose monohydrate (1.66 grams), phthalic anhydride (3.44 grams), and propylene oxide (6.25 grams) are combined and heated at 155° C. for a period of six hours under autogenous pressure with efficient stirring. The polyether-polyester produced is golden yellow in color and has an acid number of 0.9. The polymer viscosity at room temperature is about 100,000 centipoises.

EXAMPLE 27

Phthalic anhydride (2.6 grams), pentaerythritoltetrakismercaptopropionate (1.3 grams) and propylene oxide (2.6 grams) are combined and heated in a closed vessel with efficient stirring for a period of two hours at 150° C. The viscous polymeric product is very pale yellow and has an acid number of less than 1.5. It is only slightly soluble in methanol.

EXAMPLE 28

Powdered lactose monohydrate (0.52 gram), phthalic anhydride (2.0 grams) and propylene oxide (2.4 grams) are combined and heated at 140° C. in a closed vessel with stirring, under autogenous pressure, for a period of three hours, during which time a homogeneous reaction mixture is not achieved. The temperature of the reaction mixture is then raised to 165° C. and kept at this temperature for one hour. Rapid solution is achieved at this temperature and a viscous yellow-orange colored fluid is formed.

EXAMPLE 29

Sucrose (1.67) grams), water (0.27 gram), phthalic anhydride (3.5 grams) and propylene oxide (6.2 grams) are heated with efficient stirring in a closed vessel at 155° C. for a period of 270 minutes. The polyether-ester copolymer is dark golden-yellow in color and has a viscosity of about 20,000 centipoises at room temperature. The acid number of the polymer is less than 0.5.

EXAMPLE 30

Phenol (0.72 gram), phthalic anhydride (2.83 grams) and proylene oxide (3.04 grams) are combined and sealed into a heavy-walled glass tube. The tube is then heated with shaking at 150° C. for six hours. The product, slightly yellow in color, has an acid number of 22 and a viscosity of about 1000 centipoises at room temperature..

EXAMPLE 31

Trimethylolpropane (1.13 grams), phthalic anyhdride (2.66 grams), propylene oxide (2.08 grams) and vinylcyclohexane diepoxide (0.94 gram) are combined and heated in a closed vessel with efficient agitation for a period of 450 minutes at 150° C. The polymeric product is clear, colorless and perceptibly viscous at 150° C. The viscosity at room temperature is in excess of 1,000,000 centipoises.

EXAMPLE 32

Boric acid (0.88 gram), phthalic anhydride (2.20 grams) and propylene oxide (2.93 grams) are combined and heated together in a closed vessel with efficient stirring at 150° C. The phthalic anhydride dissolves first, and after a few minutes, the boric acid dissolves very rapidly with evolution of many bubbles. The homogeneous solution becomes viscous very rapidly during the next twenty minutes of heating at 150° C. The cooled product has an acid number of about 300 and turns opaque and scummy on exposure to air. The above experiment is repeated using solid phosphorous acid in place of boric acid. The reaction proceeds in a similar fashion but the resulting polymer exhibits considerably more hydrolytic stability on exposure to air.

EXAMPLE 33

Phthalic anhydride (3.1 grams), glycerol (0.4 grams) and ethylene oxide (3.8 grams) are combined and heated in a closed vessel with efficient stirring at 110° C. for a period of three hours, then at 130° C. for two hours, and at 150° C. for 14 hours. The polymeric product has a viscosity of about 5,000 centipoises at room temperature and an acid number of less than 3.

EXAMPLE 34

Propylene oxide (16.3 grams), tetrachlorophthalic anhydride (20.0 grams), glycerol (2.7 grams) and sucrose (3.9 grams) are heated with efficient stirring under autogenous pressure for 90 minutes at 130° C. and for 180 minutes at 150° C. The resulting product has a viscosity of about 200 centipoises at 100° C., and an acid number of 1.5, and a hydroxyl number of 230. It is dark in color.

EXAMPLE 35

This example illustrates the batchwise addition of epoxide or anhydride respectively in several sizable portions using trimethylolpropane, phthalic anhydride and propylene oxide as reactants. Three runs were made with the total ratios of anhydride, epoxide and starter being essentially the same.

(A) Control

Phthalic anhydride (4.00 grams), propylene oxide (4.02 grams) and 0.99 gram of trimethylolpropane are all combined and heated together under autogenous pressure with efficient stirring at 149° C. for a period of 450 minutes. The product polyether-polyester is a virtually colorless, viscous fluid at room temperature and has an acid number of 15.5.

(B) Batchwise addition of anhydride

Phthalic anhydride (1.08 grams), propylene oxide (4.11 grams) and trimethtylolpropane (1.02 grams) are combined and heated with stirring at about 150° C. for a period of 90 minutes under autogenous pressure. The reaction mixture is cooled to room temperature and a second batch of phthalic anhydride (1.00 gram) is added. The mixture is reheated to 150° C. and kept at this temperature for another 120 minutes. After cooling, a third batch of phthalic anhydride (1.00 gram) is added and the reaction mixture kept at 150° C. for another 120 minutes. Then a fourth batch of phthalic anhydride (1.00 gram) is added in a similar manner and the reaction mixture is subjected to a final heating period of 120 minutes at 150° C. The resulting polymer is pale yellow in color and has an acid number of 24.

(C) Batchwise addition of epoxide

Phthalic anhydride (4.00 grams), propylene oxide (0.99 gram) and trimethylolpropane (1.00 gram) are combined and heated with stirring at 150° C. for a period of 90 minutes under autogeneous pressure. The reaction mixture is cooled to room temperature and a second batch of propylene oxide (1.00 gram) is added. The mixture is reheated to 150° C. and kept at this temperature for another 120 minutes. After cooling, a third batch of propylene oxide (1.00 gram) is added and the reaction mixture kept at 150° C. for another 120 minuntes. Then a fourth batch of propylene oxide (1.00 gram) is added in a similar manner and the reaction mixture is subjected to a final heating period of 120 minutes at 150° C. The resulting product has an acid number of 11.

EXAMPLE 36

This example illustrates the use of a polyester-polyether copolymer in the preparation of a polyurethane foam.

Succinic anhydride (45.0 grams), propylene oxide (64.1 grams) and sorbitol (9.2 grams) are heated in a closed vessel with stirring at 160° C. for two hours and at 180° C. for 3½ hours. The product has an acid number of less than one.

To 39.1 grams of the above polymer is added 0.5 gram of water, 3.2 grams of fluorotrichloromethane, 0.3 gram of a commercial silicone-glycol copolymer surfactant, an 0.1 gram of stannous octoate, 0.05 gram of triethylenediamine and 0.2 gram of N-ethylmorpholine, and the mixture is then thoroughly stirred. Then 27.3 grams of tolylene diisocyanate are stirred into this mixture. The mixture foams and gels. After post-curing for 90 minutes at 60° C. and cooling, the foam is semi-resilient and has a density of about two pounds per cubic foot.

EXAMPLE 37

This example illustrates the use of a polyester-polyether copolymer in a sealant composition.

Propylene glycol (76 grams), succinic anhydride (486 grams) and propylene oxide (812 grams) are sealed together in a 316 stainless steel autoclave and heated with stirring at 150° C. for 75 minutes, at 160° C. for 120 minutes and at 170° C. for an additional 180 minutes. The product is pale yellow and has an acid number of less than one.

To 83 grams of the above polymer is added 14.0 grams of 2,4-tolylene diisocyanate dropwise over a period of 15 minutes, and the temperature is increased to 80° C. and held at that temperature for 30 minutes. The urethane prepolymer product is then degassed. Then 4 grams of finely divided silica is added to the prepolymer and stirred in, and the product is degassed again, and cooled.

An amine curing agent solution is prepared by combining 57 grams of the polyether-polyester copolymer and 16.4 grams of Bisphenol-A diglycidyl ether. The mixture is stirred, heated to 40° C. and 12.9 grams of 4,4'-methylene bis(2-chloroaniline) is melted and stirred in. To the mixture is further added 4.6 grams of finely divided silica and 9.0 grams of dibutyl phthalate. The mixture is well stirred, degassed and cooled.

25 grams of urethane prepolymer is mixed with 17 grams of the amine curing agent solution at room temperature. The product thickens to a paste in about 30 minutes. When this translucent paste is applied to a seam between a glass plate and a steel frame it cures over a period of 10 days to a soft resilient rubber which is strongly adhesive to both the glass and the steel.

EXAMPLE 38

This example illustrates the preparation of a light-colored casting based on a polyester-polyether polymer derived from maleic anhydride, phthalic anhydride, and propylene oxide.

Maleic anhydride (9.9 grams), phthalic anhydride (14.5 grams) tetrachlorophthalic anhydride (1.2 grams), glycerol (1.6 grams), and propylene oxide (31.4 grams) are sealed together in a heavy-walled glass tube and heated at 110° C. for 15 hours, and at 121° C. for four hours. The acid number at this point is 50. Then propylene oxide (7.0 grams) is added to the reaction mixture and the tube is resealed and heated at 108° C. for 15 hours and at 127° C. for 2.5 hours. The acid number is now 22, and the polymer has a pale yellow color.

The polymer is devolatilized by heating at 95° C. The devolatilized polymer (13.5 grams) is mixed with styrene (5.4 grams) and benzoyl peroxide (0.25 gram). The mixture is heated at 95° C. for 70 minutes, and a pale yellow, soft rubber results.

EXAMPLE 39

This example illustrates the preparation of a flexible casting based on a polyester-polyether from maleic anhydride, phthalic anhydride and propylene oxide, cross-linked by reaction with styrene.

Maleic anhydride (19.2 grams), phthalic anhydride (29.6 grams) 85% phosphoric acid (2.9 grams), and propylene oxide (61.5 grams) are sealed together in a heavy-walled glass tube. The tube is then heated at 94° C. for 26 hours, 110° C. for six hours, and 121° C. for four hours. The product is pale yellow and has an acid number of 57.

The above polymer is heated in a 190° F. oven to evaporate any volatiles. The devolatilized polymer (13.4 grams), styrene (5.7 grams), and benzoyl peroxide (0.2 gram) are mixed and heated at 99° C. for four hours. The product is a moderately firm, pale yellow rubber with very slow recovery.

EXAMPLE 40

This example illustrates the preparation of a fairly stiff rubber from a polymer with a high maleic ester content.

Maleic anhydride (22.2 grams), tetrachlorophthalic anhydride (3.4 grams), 2,2-bis(4-hydroxyphenyl)propane (4.0 grams), and propylene oxide (37.4 grams) are sealed together in a heavy-walled glass tube and heated at 108° C. for 14 hours, at 127° C. for 8 hours, and at 144° C. for 90 minutes. The product is a viscous, brown polymer.

The above polymer (20.4 grams) is mixed with styrene (9.3 grams) and benzoyl peroxide (0.6 gram). The resulting mixture is heated at 95° C. for 70 minutes. The product is a moderately stiff rubber.

EXAMPLE 41

This example illustrates the preparation of a tough, leathery casting from an unsaturated polymer with a high content of chlorendic ester units.

Maleic anhydride (10.8 grams), chlorendic anhydride (26.6 grams), glycerol (1.5 grams), and propylene oxide (28.4 grams) are sealed together in a heavy-walled glass tube. The tube is then heated at 85° C. for three hours, at 102° C. for three hours, and at 115° C. for two and one-half hours. The polymer is light brown and has an acid number of 50.

The above polymer is devolatilized and 8.9 grams are mixed with styrene (3.4 grams) and benzoyl peroxide (0.15 gram). The mixture is heated at 95° C. for 35 minutes. The product is a stiff, leathery rubber when cold.

EXAMPLE 42

Phthalic anhydride (2.55 grams), glycerol (0.25 gram) and 3,3-dimethyloxetane (3.0 grams) are combined and thoroughly mixed. The reactants are sealed together in a heavy-walled glass tube and heated at 163°

C. for 230 minutes with intermittent agitation. The polyester-polyether copolymer produced has a viscosity of more than 100,000 centipoises when cold, and has an acid number of 49.

EXAMPLE 43

Recrystallized 2,2'-diphenic anhydride (2.35 grams), glycerol (0.25 gram) and propylene oxide (1.3 grams) are sealed together in a heavy-walled glass tube and heated at 173° C. for 45 minutes. The product has a viscosity in excess of 1,000,000 at room temperature and it has an acid number of 26.

EXAMPLE 44

Phthalic anhydride (104 grams) and propylene oxide (141 grams) are placed into a one liter pressure vessel and the vessel is sealed. Then 10.3 grams of hydrogen sulfide gas are weighed in through the charging line and the charging valve is closed. The vessel and its contents are then heated with efficient stirring. At about 130° C. an exothermic reaction becomes evident, the temperature rising to about 150° C. with the maximum pressure reached being about 250 p.s.i. The vessel is maintained at 150° C. for three hours. On cooling the polymeric product is found to be a viscous liquid, pale yellow in color and has an acid number of about one.

EXAMPLE 45

Phthalic anhydride (2.5 grams), styrene oxide (4.25 grams), and trimethylolpropane (0.90 gram) are combined and heated together with stirring in a closed vessel under autogenous pressure for a period of 344 minutes at 152° C. The polymeric product is yellow and after cooling to room temperature had a viscosity of more than 100,000 centipoises.

EXAMPLE 46

Phthalic anhydride (2.35 grams), epichlorohydrin (3.9 grams) and trimethylolpropane (0.85 gram) were combined and heated at 157° C. for a period of seven hours with stirring and under autogenous pressure. The polyether-polyester is pale yellow in color and after cooling to room temperature has a viscosity of about 20,000 centipoises.

EXAMPLE 47

Water (0.1 gram), phthalic anhydride (2.1 grams) and propylene oxide (2.3 grams) were combined and heated under autogenous pressure with stirring at a temperature of 152° C. for a period of 400 minutes. The resulting polyether-polyester is completely colorless. After cooling to room temperature the polymer viscosity is about 50,000 centipoises.

EXAMPLE 48

Phthalic anhydride (16.8 grams), tetrabromophthalic anhydride (4.8 grams), sorbitol (3.5 grams) and propylene oxide (20.3 grams) are combined and sealed into a heavy-walled glass tube. The reaction mixture is heated with agitation for a period of two hours at 160° C. and for a period of 45 minutes at 170° C. The product is quite viscous at room temperature, and has an acid number of 16.

EXAMPLE 49

Dichloromaleic anhydride (8.1 grams), sorbitol (1.5 grams) and propylene oxide (6.3 grams) are placed into a heavy-walled glass tube and the tube is sealed. The contents warm appreciably on stirring. The tube is then heated wtih agitation at 138° C. for 10 minutes and 160° C. for 20 minutes. The sorbitol dissolves in the reaction mixture very quickly, and the product quickly turns yellow in color on heating. The final product has a viscosity in excess of 50,000 centipoises when cooled.

EXAMPLE 50

Cyclohexene oxide (4.3 grams), phthalic anhydride (2.9 grams) and ethylene glycol (0.3 gram) are sealed together in a heavy-walled glass tube and heated with intermittent agitation for 3½ hours at 152° C. The product is a clear, viscous liquid at oven temperature, and has a viscosity in excess of 100,000 centipoises at room temperature.

EXAMPLE 51

This example illustrates the preparation of an unsaturated polyester-polyether copolymer based on itaconic anhydride, and its polymerization with styrene.

Itaconic anhydride (23.9 grams), glycerol (3.6 grams) and propylene oxide (32.5 grams) are sealed together in a heavy-walled glass tube and heated at 140° C. for 18 hours.

The above polymer (12.1 grams), styrene (5.2 grams) and benzoyl peroxide (0.2 gram) are mixed together and heated ta 90° C. for three hours. The resulting product is a moderately stiff rubber.

EXAMPLE 52

This example illustrates the preparation of a coating based on a polymer prepared from maleic anhydride, tetrahydrophthalic anhydride and ethylene oxide.

Maleic anhydride (27.4 grams) tetrahydrophthalic anhydride (13.2 grams) and ethylene glycol (2.7 grams) are placed into a 316 stainless steel bomb. Then ethylene oxide (58.3 grams) is weighed in, and the bomb is sealed. The bomb is then heated at 126° C. for 22 hours, with rocking.

The product of the above reaction (3.6 grams), is mixed with styrene (2.0 grams) and azobis(isobutyronitrile) (0.07 gram). The viscous mixture is flow-coated onto a glass plate and cured at 63° C. for six hours. The product is a hard, clear coating.

EXAMPLE 53

Benzoic acid (1.43 grams), phthalic anhydride (2.62 grams) and propylene oxide (3.33 grams) are sealed into a heavy-walled glass tube and heated with intermittent shaking for 4 hours at 160° C. The product has an acid number of 9.9.

EXAMPLE 54

Benzoic acid (1.50 grams), phthalic anhydride (1.93 grams) and propylene oxide (2.08 grams) are sealed into a heavy-walled glass tube and heated with intermittent shaking for 2¼ hours at 160° C. The product has an acid number of 51.

EXAMPLE 55

Phthalic anhydride (43.2 grams) and propylene oxide (47.6 grams) are placed in a 316 stainless steel bomb, and then hydrogen chloride gas (5.9 grams) is weighed in. The bomb is sealed and then slowly heated to 150° C., with shaking, and the temperature is maintained at 150° C. for 4 hours. When cooled, the product has a viscosity of about 10,000 poises.

This example is repeated with equimolar amounts of hydrogen fluoride, hydrogen bromide, and hydrogen cyanide in place of the hydrogen chloride, with similar results. All of these polymers have a single hydroxyl or carboxylic acid group at one end of a linear polymer chain, and at the other end of the chain is located the halogen or nitrile residue of the starter.

EXAMPLE 56

This example illustrates the very high ratio of epoxide to anhydride required when preparing a polyether-polyester copolymer of low equivalent weight. About 5.5 mols of propylene oxide are combined chemically per mol of combined phthalic anhydride.

Glycerol (3.1 grams), phthalic anhydride (3.5 grams) and propylene oxide (7.5 grams) are sealed together in a heavy-walled glass tube and heated at 150° C. for three hours. The product is a colorless, glass-clear liquid with an acid number of 1.0, and a viscosity of 15,000 centipoises at room temperature.

EXAMPLE 57

Commercial pearl corn starch, 169.3 grams, and 245.2 grams of a commercially available mixture of polyalcohols having from 3 to 6 carbon atoms from 3 to 6 hydroxyl groups and an average molecular weight of 160 and an average equivalent weight of 32 were heated to 100° C. and stirred until a relatively thin uniform suspension of the starch resulted. On heating this suspension overnight, a translucent gel was formed. The gel was then heated for 1 hour at 150° C., whereupon a clear, viscous solution resulted.

200.5 grams of the above solution, 355.3 grams of phthalic anhydride, and 410 grams of propylene oxide were placed in a 1-liter stainless steel pressure vessel fitted with agitator and the vessel was sealed. The vessel was then heated with stirring to 130° C., and the temperature was maintained in the range of 130–155° C. for 3 hours. At the end of this time, the pressure had dropped to a constant value. The vessel was vented and the product collected. The product weighed 910 grams, was light amber in color, and had a viscosity of about 3 million centipoises at 25° C. The acid number was 1.0 and the hydroxyl number was 295.

This example was repeated, using potato starch in place of the corn starch, with similar results.

This example was again repeated, using British Gum in place of the corn starch, with similar results, except that the polymeric product had a viscosity of about 2 million centipoises at 25° C. and a dark amber color.

EXAMPLE 58

A mixture of 6.1 grams of dipentaerythritol, 24.5 grams of phthalic anhydride, and 25.5 grams of propylene oxide were sealed together in a thick-walled glass tube and heated together at 150° C. for three hours with shaking. The tube was then heated at 160° C. for an additional two hours. The product was a viscous liquid and had an acid number of about 5, and a molecular weight of about 2200.

To 25.1 grams of the above copolymer in a 100 ml. three-necked flask equipped with stirrer, thermometer, and $CO_2$-sparge was added 19.9 grams of alkyd-grade soya oil fatty acids. The contents were then heated at 230° C. for five hours, with continuous stirring and sparging. At the end of this time, the acid number had dropped to about 8. The product was a moderately viscous, pale yellow oil.

A sample of the oil was diluted with xylene, and 0.02 percent cobalt naphthenate (based on cobalt metal per weight of alkyd resin) was added. The xylene solution was coated onto a glass plate and allowed to stand in the air. In about one- and one-half hours the coating had become tack-free.

EXAMPLE 59

Linseed oil fatty anhydride was prepared by refluxing water-white linseed oil fatty acids with excess acetic anhydride followed by vacuum stripping and vacuum distillation.

A mixture of 28.7 grams of this anhydride, 9.7 grams of phthalic anhydride, 2.1 grams of glycerol, 8.0 grams of "Unox 201" (an aliphatic diepoxide, epoxymethylcyclohexylmethyl epoxymethyl cyclohexanecarboxylate) and 15.9 grams of propylene oxide were sealed together in a heavy-walled glass tube and heated at 150° C. for two hours, followed by additional heating at 165° C. for 4 hours. The product had a very low acid number and contained some unreacted propylene oxide. When diluted, catalyzed, and coated out, this resin air dried satisfactorily.

EXAMPLE 60

A mixture of 5.3 grams of propylene glycol, 20.8 grams of phthalic anhydride, 10.2 grams of propylene oxide and 19.6 grams of allyl glycidyl ether was sealed in a thick-walled glass tube and heated together at 147° C. for eight hours with intermittent shaking. At the end of this time the product is a moderately viscous fluid, and has an acid number of less than ten.

Ten grams of the above resin is mixed with 10 ml. of methyl isobutyl ketone, and the mixture is coated out onto a glass plate. The resin dries quickly to a hard film.

EXAMPLE 61

A mixture of 14.6 grams of phthalic anhydride and 21.2 grams of the diallyl ether of trimethylolpropane was warmed and stirred until solution was effected. Then the mixture was heated at 120° C. for two hours, and at 150° C. for an additional three hours.

To the above mixture was added 31.3 grams of the polyesterether copolymer, prepared as described in Example 58, and the resulting mixture was heated at 230° C. with stirring and a continuous $CO_2$ sparge for five hours. At the end of this time the acid number was about nine. The product was a viscous liquid, and when it was mixed with styrene and coated out it formed a hard, tough film.

EXAMPLE 62

In a 250 ml., 3-necked flask, fitted with a stirrer and thermometer was placed 121.8 grams of distilled bis-(chloromethyl) oxetane, 27.1 grams of phthalic anhydride, and 48.1 grams of trimethylolpropane. The mixture was heated to 140° C., at which point the mixture began to exotherm. The temperature was then held in the range of 140–170° C. for 1 hour. Then 13.3 grams of phthalic anhydride were added and the mixture heated at 180–185° C. for 4½ hours. At the end of this time the acid number was 15, the color was pale amber, and the product had a viscosity of about 50,000 centipoises at 25° C.

EXAMPLE 63

In a stirred, 1-liter, 316 stainless steel autoclave was placed 33.3 grams of dried, ground, β-cyclodextrin, 115.1 grams of a mixture of aliphatic polyalcohols having from 3 to 6 carbon atoms and 3 to 6 hydroxyl groups and with an average equivalent weight of 32 and an average molecular weight of 160, 315.2 grams of phthalic anhydride, and 398 grams of propylene oxide. The vessel was sealed and heated at 130–150° C. for 4½ hours and then vented. The product was pale straw in color, and had a viscosity of 406,000 centipoises at 26° C. The product weight was 875 grams.

EXAMPLE 64

In a stirred, 1-liter, 316 stainless steel pressure vessel was placed 38.5 grams of fumaric acid, 450.9 grams of tetrabromophthalic anhydride, 64.6 grams of maleic anhydride, and 314 grams of propylene oxide. The vessel was heated at 120–140° C. for 3 hours. The vessel was then vented, and 63.7 grams of maleic anhydride were added. Then the mixture was again heated at 140–160° C. for 3 additional hours. The product was pale straw in color, had an acid number of about 40, and a viscosity of 1.5 million centipoises at 25° C.

EXAMPLE 65

In a stirred, 1-liter, 316 stainless steel pressure vessel was placed 67.7 grams of an oven-dried canary corn dextrin having a water solubility of 95%, 76.0 grams of a mixture of aliphatic polyalcohols having from 3–6 carbon atoms, and from 3–6 hydroxyl groups and with an average equivalent weight of 32 and an average molecular weight of 160, 233.3 grams of phthalic anhydride, and 302 grams of propylene oxide. The vessel was then sealed and heated at 140–150° C. for 3½ hours. The vessel was then vented and the product recovered. The product was pale amber in color, and was slightly cloudy in appearance. The product weighed 615 grams, and had a viscosity of 5 million centipoises at 27° C.

EXAMPLE 66

A solution of corn starch was prepared by mixing 199.6 grams of powdered pearl corn starch with 289.9 grams of a commercial mixture of aliphatic polyalcohols having from 3 to 6 carbon atoms and 3 to 6 hydroxyl groups, and having an average equivalent weight of 32 and an average molecular weight of 160. The mixture was heated at 100° C. and stirred until a homogeneous slurry was obtained. The mixture was then heated at 150° C. with stirring until a constant weight was reached.

In a stirred, 316 stainless steel, 1-liter pressure vessel was placed 198.9 grams of the above starch solution, 340.5 grams of phthalic anhydride, and 432 grams of propylene oxide. The vessel was sealed and heated at 140–155° C. for 4 hours. The vessel was then vented, and the product recovered. The product was very pale golden brown in color and had a viscosity of 4 million centipoises at 30° C.

This example was repeated using potato starch in place of the corn starch, and very similar results were obtained.

This example was repeated using British Gum in place of the corn starch, and similar results were again obtained.

This example was repeated once more using solubilized corn starch in place of the pearl starch. Similar results were obtained, except that the starch solution was faster than in the original example.

This example was again repeated, using a white corn dextrin having a water solubility of 75% in place of the pearl starch. Similar results were again obtained, except that the final product was somewhat less viscous.

EXAMPLE 67

In an agitated, 1-liter, 316 stainless steel pressure vessel was placed 107.1 grams of lauryl mercaptan, and 157.3 grams of tetrahydrophthalic anhydride, and the vessel was closed. Then 9½ ounces of ethylene oxide were weighed into the vessel under pressure. The mixture was heated at 130–160° C. for 8 hours, and the vessel was then vented.

The product was pale yellow in color, and had a viscosity of about 1000 centipoises at 25° C.

EXAMPLE 68

In an agitated, 1-liter, 316 stainless steel autoclave was placed 141.3 grams of anhydrous citric acid, and 153.5 grams of phthalic anhydride. The vessel was closed, and 8½ ounces of ethylene oxide were weighed in. The vessel was then heated at 135–160° C. for 4 hours. At the end of this time, the vessel was vented and the product recovered. The product was very pale in color, had an acid number of about 1, and a viscosity of 15,000 centipoises at 25° C.

EXAMPLE 69

A mixture of 8.9 g. dipentaerythritol, 24.5 g. phthalic anhydride, and 25.5 g. propylene oxide were sealed together in a thick-walled glass tube and heated together at 150° C. for three hours with shaking. The tube was then heated at 160° C. for an additional two hours. The product was a viscous liquid and had an acid number of about 5, a molecular weight of about 1700, and a hydroxyl number of about 190.

To 20.6 g. of the above copolymer in a 100 ml., three-necked flask equipped with stirrer, thermometer, and $CO_2$-sparge was added 19.9 g. of alkyd-grade soya oil fatty acids. The contents were then heated at 230° C. for five hours, with continuous stirring and sparging. At the end of this time, the acid number had dropped to about 7. The product was pale yellow and moderately viscous.

A sample of the product was diluted with xylene, and 0.02 percent cobalt naphthenate (based on cobalt metal per weight of alkyd resin) was added. The solution was coated onto a glass plate and allowed to stand in the air. The coating was tack-free in about two hours.

EXAMPLE 70

A mixture of 5.3 g. propylene glycol, 20.8 g. phthalic anhydride, 10.2 g. propylene oxide and 19.6 g. allyl glycidyl ether was sealed in a thick-walled glass tube and heated together at 147° C. for eight hours with intermittent shaking. At the end of this time the product was a moderately viscous fluid, and had an acid number of less than ten.

10 g. of the above resin was mixed with 10 ml. of methyl isobutyl ketone, and the mixture was coated out onto a glass plate. The coating dried quickly on baking at 100° C.

EXAMPLE 71

A mixture of 30.3 g. of polyester-ether copolymer prepared according to Example 69 and 14.5 g. of phthalic anhydride was heated at 150° C. for two hours with stirring. Then 21.9 g. of the diallyl ether of trimethylolpropane was added, and the temperature was raised to 225° C. Heating was continued at 225° C. with stirring and $CO_2$ sparge until the acid number dropped to about eight. The product was a viscous liquid which cured quickly to a hard, tough film on exposure to air.

APPROXIMATE AVERAGE DEGREE OF POLYMERIZATION IN POLYETHER SEGMENT (MAXIMUM VALUES) (HYDROXYL STARTER)

| Example No.: | Degree of polymerization |
|---|---|
| 3 | 3.44 |
| 4 | 2.99 |
| 5 | 2.80 |
| 6 | 2.95 |
| 9 | 2.53 |
| 10 | 2.50 |
| 13 | 2.71 |
| 15 | 2.79 |
| 24 | 4.60 |
| 26 | 4.63 |
| 27 | 2.55 |
| 29 | 4.51 |
| 33 | 4.13 |
| 34 | 4.01 |

EXACT AVERAGE DEGREE OF POLYMERIZATION IN POLYETHER SEGMENT (ACID STARTER)

| Example No.: | Degree of polymerization |
|---|---|
| 25 | 2.49 |
| 53 | 2.04 |
| 54 | 1.76 |

SUMMARY OF PERTINENT DATA FOR PRODUCTS OF SOME OF ABOVE EXAMPLES

| Example | Theor. Av. Mol. Weight | Number of Monomer Units per Molecule | Number of Monomer Units per Chain End | Polymer Functionality |
|---|---|---|---|---|
| 1 | 595 | 5.9 | 2.0 | 3 |
| 2 | 1,028 | 12.5 | 4.2 | 3 |
| 3 | 814 | 10.2 | 3.4 | 3 |
| 4 | 3,720 | 46.1 | 15.4 | 3 |
| 5 | 811 | 8.8 | 2.9 | 3 |
| 6 | 2,780 | 33.2 | 5.5 | 6 |
| 7 | 2,000 | 27.0 | 13.5 | 2 |
| 8 | 2,450 | 33.2 | 5.5 | 6 |
| 9 | 1,395 | 9.9 | 3.3 | 3 |
| 10 | 1,665 | 11.7 | 3.9 | 3 |
| 11 | 2,540 | 31.7 | 7.7 | 4.1 av. |
| 12 | 2,460 | 31.2 | 6.2 | 5.0 av. |
| 14 | 1,765 | 21.7 | 7.2 | 3 |
| 15 | 1,840 | 13.4 | 4.5 | 3 |
| 16 | 1,120 | 12.6 | 4.2 | 3 |
| 17 | 1,620 | 19.8 | 6.9 | 2.9 av. |
| 18 | 1,460 | 19.5 | 7.8 | 2.5 av. |
| 19 | 1,080 | 13.2 | 4.4 | 3 |
| 20 | 619 | | | 2.68 av. |
| 21 | 1,560 | 18.5 | 4.6 | 4 |
| 22 | 980 | 11.6 | 3.3 | 3.5 av. |
| 23 | 389 | | | 2.92 av. |
| 24 | 600 | | | 3.4 av. |
| 25 | 790 | 7.8 | 7.8 | 1 |
| 26 | 678 | 9.3 | 2.7 | 3.5 av. |
| 27 | 2,440 | 24.2 | 6.0 | 4 |
| 28 | 1,710 | 20.0 | 4.0 | 5.0 av. |
| 29 | 586 | | | 3.48 av. |
| 30 | 870 | 10.4 | 10.4 | 1 |
| 31 | ca. 4,050 | | | ca. 15 av. |
| 32 | 422 | 5.6 | 1.9 | 3 |
| 35A | 1,221 | 16.02 | 5.34 | 3 |
| 35B | 1,224 | 15.93 | 5.31 | 3 |
| 35C | 1,206 | 15.84 | 5.28 | 3 |

We claim:
1. The process of producing a polyether-ester copolymer which consists essentially of copolymerizing at superatmospheric pressure and at a temperature ranging from about 70° to about 180° C. (1) a cyclic monoether difunctionally reactive under the process conditions, having from two to 21 carbon atoms, and selected from the group consisting of monoepoxides and monooxetanes, (2) a cyclic monoanhydride of an organic polycarboxylic acid and (3) from 0.1 to 75 percent by weight of the total reaction mixture of a polymerization starter of the group consisting of water, hydrogen-containing inorganic acids capable of effecting the ring-opening of cyclic monoethers without destructive decomposition, and organic compounds having at least one radical selected from the group consisting of hydroxyl, carboxyl and sulfhydryl radicals, and mixtures thereof, said reaction being conducted in the absence of strongly basic catalysts and in a manner such that during the time in which the copolymerization occurs said (1) is present intimately admixed with said (2) and (3) in an amount such that the concentration ratio of equivalents of cyclic ether groups to the sum of the equivalents of carboxylic acid groups plus one-half the equivalents of anhydride groups in the reactant solution is at least 0.3, to effect simultaneously the homopolymerization of said cyclic monoether into polyether segments of varying length with an average degree of polymerization of at least 1.5 and the copolymerization reaction with said anhydride to produce a random polyether-ester copolymer with linear polymer chains attached at one end to residues of said (3) and carrying at the other end chemically reactive terminal radicals selected from the group consisting of hydroxyl and carboxyl radicals, with the total mol ratio of (1) to (2) becoming chemically combined being at least 1.5.

2. The process of producing a polyether-ester copolymer which consists essentially of copolymerizing at superatmospheric pressure and at a temperature ranging from about 70° to about 180° C. (1) a cyclic monoether difunctionally reactive under the process conditions and selected from the group consisting of saturated aliphatic terminal monoepoxides having from two to 21 carbon atoms and monooxetanes having from three to six carbon atoms, (2) a cyclic monoanhydride of a 1,2-dicarboxylic acid having from four to fourteen carbon atoms and from zero to six halogen substituents selected from the group consisting of chloro and bromo radicals, and (3) from 0.1 to 10 percent by weight of the total reaction mixture of water, said reaction being conducted in the absence of strongly basic catalysts and in a manner such that during the time in which the copolymerization occurs said (1) is present intimately admixed with said (2) and (3) in an amount such that the concentration ratio of equivalents of cyclic ether groups to the sum of the equivalents of carboxylic acid groups plus one-half the equivalents of anhydride groups in the reactant solution is at least 0.3, to effect simultaneously the homopolymerization of said cyclic monoether into polyether segments of varying length with an average degree of polymerization of at least 1.5, and the copolymerization reaction with said anhydride to produce a random polyetherester copolymer with linear polymer chains attached at one end to residues of said (3) and carrying at the other end chemically reactive terminal radicals selected from the group consisting of hydroxyl radicals and carboxyl radicals, with the total mol ratio of (1) to (2) becoming chemically combined being at least 2.0.

3. The process of producing a polyether-ester copolymer which consists essentially of copolymerizing at superatmospheric pressure and at a temperature ranging from about 70° to about 180° C. (1) a cyclic monoether difunctionally reactive under the process conditions and selected from the group consisting of saturated aliphatic terminal monoepoxides having from two to 21 carbon atoms and monooxetanes having from three to six carbon atoms, (2) a cyclic monoanhydride of a 1,2-dicarboxylic acid having from four to fourteen carbon atoms and from zero to six halogen substituents selected from the group consisting of chloro and bromo radicals, and (3) from 0.1 to 25 percent by weight of the total reaction mixture of a hydrogen-containing inorganic acid capable of effecting the ring-opening of cyclic monoethers without destructive decomposition and aqueous mixtures thereof, said reaction being conducted in the absence of strongly basic catalysts and in a manner such that during the time in which the copolymerization occurs said (1) is present intimately admixed with said (2) and (3) in an amount such that the concentration ratio of equivalents of cyclic ether groups to the sum of the equivalents of carboxylic acid groups plus one-half the equivalents of anhydride groups in the reactant solution is at least 0.3, to effect simultaneously the homopolymerization of said cyclic monoether into polyether segments of varying length with an average degree of polymerization of at least 1.5, and the copolymerization reaction with said anhydride to produce a random polyether-ester copolymer with linear polymer chains attached at one end to residues of said (3) and carrying at the other end chemically reactive terminal radicals selected from the group consisting of hydroxyl and carboxyl radicals, with the total mol ratio of (1) to (2) becoming chemically combined being at least 1.5.

4. The process of producing a polyether-ester copolymer which consists essentially of copolymerizing at superatmospheric pressure and at a temperature ranging from about 70° to about 180° C. (1) a cyclic monoether difunctionally reactive under the process conditions and selected from the group consisting of saturated aliphatic terminal monoepoxides having from two to 21 carbon atoms and monooxetanes having from three to six carbon atoms, (2) a cyclic monoanhydride of a 1,2-dicarboxylic acid having from four to fourteen carbon atoms and from zero to six halogen substituents selected from the group consisting of chloro and bromo radicals, and (3) from 0.1 to 75 percent by weight of the total reaction mixture of an organic polymerization starter having at least one sulfhydryl radical, said reaction being conducted in the absence of strongly basic catalysts and in a manner such that during the time in which the copolymerization occurs said (1) is present intimately admixed with said (2) and (3) in an amount such that the concentration ratio of equivalents of cyclic ether groups to the sum of the equivalents of carboxylic acid groups plus one-half the equivalents of anhydride groups in the reactant solution is at least 0.3, to effect simultaneously the homopolymerization of said cyclic monoether into polyether segments of varying length with an average degree of polymerization of at least 1.5, and the copolymerization reaction with said anhydride to produce a random polyether-ester copolymer with linear polymer chains attached at one end to residues of said (3) and carrying at the other end chemically reactive terminal radicals selected from the group consisting of hydroxyl and carboxyl radicals, with the total mol ratio of (1) to (2) becoming chemically combined being at least 1.5.

5. The process according to claim 2 in which said monoether is selected from the group consisting of ethylene oxide, propylene oxide epichlorohydrin, and 1,2-butylene oxide and said anhydride is selected from the group consisting of phthalic anhydride, 3,4,5,6-tetrachlorophthalic anhydride, 3,4,5,6-tetrabromophthalic anhydride, 1,4,5,6,7,7-hexachlorobicyclo-(2,2,1)-5-heptene - 2,3 - dicarboxylic acid anhydride, succinic anhydride, and maleic anhydride.

6. The process of producing a polyester-ester copolymer which consists essentially of copolymerizing at superatmospheric pressure and at a temperature ranging from about 70° to about 180° C. (1) a cyclic monoether difunctionally reactive under the process conditions and selected from the group consisting of saturated aliphatic terminal monoepoxides having from two to 21 carbon atoms and monooxetanes having from three to six carbon atoms, (2) a cyclic monoanhydride of a 1,2-dicarboxylic acid having from four to fourteen carbon atoms and from zero to six halogen substituents selected from the group consisting of chloro and bromo radicals, and (3) from 0.1 to 75 percent by weight of the total reaction mixture of an organic polymerization starter having at least one carboxyl radical, said reaction being conducted in the absence of strongly basic catalysts and in a manner such that during the time in which the copolymerization occurs said (1) is present intimately admixed with said (2) and (3) in an amount such that the concentration ratio of equivalents of cyclic ether groups to the sum of the equivalents of carboxylic acid groups plus one-half the equivalents of anhydride groups in the reactant solution is at least 0.3, to effect simultaneously the homopolymerization of said cyclic monoether into polyether segments of varying length with an average degree of polymerization of at least 1.5, and the copolymerization reaction with said anhydride to produce a random polyether-ester copolymer with linear polymer chains attached at one end to residues of said (3) and carrying at the other end chemically reactive terminal radicals selected from the group consisting of hydroxyl and carboxyl radicals, with the total mol ratio of (1) to (2) becoming chemically combined being at least 2.0.

7. The process according to claim 3 in which said cyclic monoether is selected from the group consisting of ethylene oxide, propylene oxide, epichlorohydrin, and 1,2-butylene oxide, and mixtures thereof, said anhydride is selected from the group consisting of phthalic anhydride, 3,4,5,6-tetrachlorophthalic anhydride, 3,4,5,6-tetrabromophthalic anhydride, 1,4,5,6,7,7-hexachlorobicyclo-(2,2,1)-5-heptene-2,3-dicarboxylic acid anhydride, succinic anhydride, and maleic anyhydride, and said inorganic acid is hydrogen sulfide.

8. The process of claim 6 in which said monoether is selected from the group consisting of ethylene oxide, propylene oxide, epichlorohydrin, and 1,2-butylene oxide and said anhydride is selected from the group consisting of phthalic anhydride, 3,4,5,6-tetrachlorophthalic anhydride, 1,4,5,6,7,7 - hexachlorobicyclo-(2,2,1)-5-heptene-2,3-dicarboxylic anhydride, succinic anhydride, and maleic anhydride and said starter is selected from the group consisting of carboxylic acids having from two to 54 carbon atoms and from one to four carboxylic acid groups and hydroxycarboxylic acids of from two to 18 carbon atoms, from one to five hydroxyl groups and from one to three carboxyl groups.

9. The process according to claim 4 in which said cyclic monoether is selected from the group consisting of ethylene oxide, propylene oxide, epichlorohydrin, and 1,2-butylene oxide, and mixtures thereof, said anhydride is selected from the group consisting of phthalic anhydride, 3,4,5,6-tetrachlorophthalic anhydride, 3,4,5,6-tetrabromophthalic anhydride, 1,4,5,6,7,7-hexachlorobicyclo-(2,2,1)-5-heptene,2,3-dicarboxylic acid anhydride succinic anhydride, and maleic anhydride, and said organic sulfhydryl starter has from one to 24 carbon atoms and from one to six sulfhydryl radicals.

10. The process of producing a polyether-ester copolymer which consists essentially of copolymerizing at superatmospheric pressure and at a temperature ranging from about 70° to about 180° C. (1) a cyclic monoether difunctionally reactive under the process conditions and selected from the group consisting of saturated aliphatic terminal monoepoxides having from two to 21 carbon atoms and monooxetanes having from three to six carbon atoms, (2) a cyclic monoanhydride of a 1,2-dicarboxylic acid having from four to fourteen carbon atoms and from zero to six halogen substituents selected from the group consisting of chloro and bromo radicals, and (3) from 0.1 to 75 percent by weight of the total reaction mixture of an organic polymerization starter having at least one hydroxyl radical, said reaction being conducted in the absence of strongly basic catalysts and in a manner such that during the time in which the copolymerization occurs said (1) is present intimately admixed with said (2) and (3) in an amount such that the concentration ratio of equivalents of cyclic ether groups to the sum of the equivalents of carboxylic acid groups plus one-half the equivalents of anhydride groups in the reactant solution is at least 0.3, to effect simultaneously the homopolymerization of said cyclic monoether into polyether segments of varying length with an average degree of polymerization of at least 1.5, and the copolymerization reaction with said anhydride to produce a random polyether-ester copolymer with linear polymer chains attached at one end to residues of said (3) and carrying at the other end chemically reactive terminal radicals selected from the group consisting of hydroxyl and carboxyl radicals, with the total mol ratio of (1) to (2) becoming chemically combined being at least 2.0.

11. The process of claim 10 in which said monoether is selected from the group consisting of ethylene oxide, propylene oxide, epichlorohydrin, and 1,2-butylene oxide and said anhydride is selected from the group consisting of phthalic anhydride, 3,4,5,6-tetrachlorophthalic anhydride, 3,4,5,6-tetrabromophthalic anhydride, 1,4,5,6,7,7-hexachlorobicyclo-(2,2,1)-5-heptene-2,3-dicarboxylic acid anhydride, succinic anhydride, and maleic anhydride and said starter is selected from the group consisting of aliphatic monoalcohols having from one to 18 carbon atoms and aliphatic diols having from two to 18 carbon atoms, with the total mol ratio of (1) to (2) becoming chemically combined being more than 2.0.

12. The process of producing a polyether-ester copolymer which consists essentially of copolymerizing at superatmospheric pressure and at a temperature ranging from about 70° to about 180° C. (1) a cyclic monoether difunctionally reactive under the process conditions and selected from the group consisting of saturated aliphatic terminal monoepoxides having from two to 21 carbon atoms and monooxetanes having from three to six carbon atoms, (2) a cyclic monoanhydride of a 1,2-dicarboxylic acid having from four to fourteen carbon atoms and from zero to six halogen substituents selected from the group consisting of chloro and bromo radicals, and (3) from 0.1 to 75 percent by weight of the total reaction mixture of an organic polymerization starter having an average hydroxyl radical functionality of at least three and being selected from the group consisting of aliphatic polyols, saccharides, saccharide hydrates, alcoholic glucosides, and aqueous and alcoholic solutions thereof, said reaction being conducted in the absence of strongly basic catalysts and in a manner such that during the time in which the copolymerization occurs said (1) is present intimately admixed with said (2) and (3) in an amount such that the concentration ratio of equivalents of cyclic ether groups to the sum of the equivalents of carboxylic acid groups plus one-half the equivalents of anhydride groups in the reactant solution is at least 0.3, to effect simultaneously and homopolymerization of said cyclic monoether into polyether segments of varying length with an average degree of polymerization of at least 1.5, and the copolymerization reaction with said anhydride to produce a random polyether-ester copolymer with linear polymer chains attached at one end to residues of said (3) and carrying at the other end chemically reactive terminal radicals selected from the group consisting of hydroxyl and carboxyl radicals, with the total mol ratio of (1) and (2) becoming chemically combined being at least 1.5.

13. The process of claim 8 in which said starter is citric acid.

14. The process of claim 12 in which said monoether is selected from the group consisting of ethylene oxide, propylene oxide, epichlorohydrin, and 1,2-butylene oxide and said anhydride is selected from the group consisting of phthalic anhydride, 3,4,5,6-tetrachlorophthalic anhydride, 3,4,5,6-tetrabromophthalic anhydride, 1,4,5,6,7,7-hexachlorobicyclo-(2,2,1)-5-heptene - 2,3 - dicarboxylic acid anhydride, succinic anhydride, and maleic anhydride, and said starter is selected from the group consisting of aliphatic polyols having from three to fifteen carbon atoms and from three to eight hydroxyl groups, and aqueous solutions thereof.

15. The process of claim 12 in which said monoether is selected from the group consisting of ethylene oxide, propylene oxide, epichlorohydrin, and 1,2-butylene oxide and said anhydride is selected from the group consisting of phthalic anhydride, 3,4,5,6-tetrachlorophthalic anhydride, 3,4,5,6-tetrabromophthalic anhydride, 1,4,5,6,7,7-hexachlorobicyclo-(2,2,1) - 5 - heptene-2,3-dicarboxylic acid anhydride, succinic anhydride, and maleic anhydride, and said starter is selected from the group consisting of saccharides having from five to 18 carbon atoms and from four to 11 hydroxyl groups, hydrates of such saccharides, aqueous solutions of such saccharides, alcoholic solutions of such saccharides, and alcoholic glucosides.

16. The process of claim 15 in which the said saccharide is selected from the group consisting of dextrose and alpha methyl glucoside.

17. The process of claim 10 in which said monoether is selected from the group consisting of ethylene oxide, propylene oxide epichlorohydrin, and 1,2-butylene oxide and said anhydride is selected from the group consisting of phthalic anhydride, 3,4,5,6-tetrachlorophthalic anhydride, 3,4,5,6-tetrabromophthalic anhydride, 1,4,5,6,7,7-hexachlorobicyclo-(2,2,1)-5-heptene - 2,3 - dicarboxylic acid anhydride, succinic anhydride, and maleic anhydride and said starter is a phenol having from six to 18 carbon atoms and from one to three phenolic hydroxyl groups, and with the total mol ratio of (1) to (2) becoming chemically combined being more than 2.0.

18. The process of claim 12 in which the said starter is a saccharide having more than three monosaccharide units per molecule.

19. The process of claim 18 in which the said saccharide is selected from the group consisting of cyclodextrins and solubilized starches.

20. The process of claim 12 in which the said starter is a mixture consisting of from five to 80 percent by weight of a dextrin selected from the group consisting of white corn dextrins, canary corn dextrins, and Brititsh Gums and from 20 to 95 percent by weight of a polyol having from three to six carbon atoms and from three to six hydroxyl groups.

21. The process of claim 12 in which said starter is a mixture consisting of from five to 80 percent by weight of a starch and from 20 to 95 percent by weight of a polyol having from three to six carbon atoms and from three to six hydroxyl groups.

22. The process of claim 21 in which said starch is selected from the group consisting of corn starch, wheat starch, and potato starch.

23. A random polyether-ester copolymer having polymer chains carrying at one chain end terminal radicals selected from the group consisting of hydroxyl and carboxylic acid radicals and being joined through ester and ether linkages at the other chain end to a residue derived from a polymerization starter selected from the group consisting of water, hydrogen sulfide, and organic compounds having at least one radical selected from the group consisting of hydroxyl, carboxyl, and sulfhydryl radicals, the said polymer chains being composed of (A) polyether segments of the formula —(O—R)$_n$— wherein R is an alkylene radical having from two to 21 carbon atoms and is selected from the group consisting of 1,2-alkylene and 1,3-alkylene radicals and $n$ is a positive integer varying from one to ten with the average value being at least 1.5, and (B) ester units of the formula

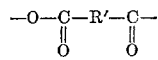

wherein R' is a hydrocarbon radical of from two to twelve carbon atoms and from zero to six halogen substituents selected from the group consisting of chloro and bromo radicals, with the molar ratio of said R to said R' being at least 1.5, said polymerization starter residue constituting from 0.1 to not more than 75 percent by weight and said —O—R— units ranging from ten to 65 percent by weight of the total composition.

24. The composition of claim 23 in which said copolymer molecules having identical starter residues have a weight-average molecular weight to number-average molecular weight ratio of less than 1.5.

25. The composition of claim 23 in which R is a 1,3-alkylene radical of from three to six carbon atoms and from zero to six halogen substituents selected from the group consisting of chloro and bromo radicals.

26. The composition of claim 23 in which said R is a lower aliphatic 1,2-alkylene radical, and having the molar ratio of said R to said R' being more than 2.0.

27. The composition of claim 26 in which said R is selected from the group consisting of 1,2-ethylene, 1,2-propylene, 3-chloro-1,2-propylene, and 1,2-butylene, and R' is selected from the group consisting of 1,2-ethylene, 1,2-ethenylene, 1,2 - phenylene, 3,4,5,6-tetrachloro-1,2-phenylene, 3,4,5,6 - tetrabromo-1,2-phenylene, and 1,4,5,6,7,7-hexachlorobicyclo-(2,2,1)-5-heptenylene-2,3-.

28. A copolymer having the general formula

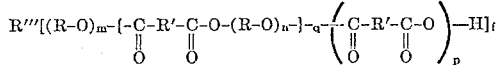

wherein R''' is the residue attached to the active hydrogens of a polymerization starter R'''(H)$_f$ selected from the group consisting of water, inorganic hydrogen-containing acids capable of effecting the ring-opening of cyclic monoethers without destructive decomposition, and organic compounds having at least one radical selected from the group consisting of hydroxyl, carboxyl and sulfhydryl radicals, $f$ is an integer having a value of at least one, R is an alkylene radical having from 2 to 21 carbon atoms and is selected from the group consisting of 1,2-alkylene radicals and 1,3-alkylene radicals, R' is a hydrocarbon radical of from two to twelve carbon atoms and from zero to six halogen substituents selected from the group consisting of chloro and bromo radicals, $m$ is an integer varying from zero to ten, $n$ is a positive integer having a minimum value of one with the average value of $n$ being at least 2.0, $q$ is an integer varying from zero to 100 with the average value of $q$ being at least 0.1, and $p$ is an integer with a value of zero and one, with the average value of $p$ ranging from zero to one.

29. The composition of claim 28 wherein R is selected from the group consisting of 1,2-ethylene, 1,2-propylene, 3-chloro-1,2-propylene, and 1,2-butylene, and R' is selected from the group consisting of 1,2-phenylene, 3,4,5,6-tetrachloro - 1,2 - phenylene, 3,4,5,6-tetrabromo-1,2-phenylene, 1,4,5,6,7,7 - hexachlorobicyclo-(2,2,1)-5-heptenylene-2,3-, 1,2-ethylene, and 1,2-ethenylene, and said R''' is selected from the group consisting of —O— and —S—, and $f$ has a value of two.

30. The composition of claim 28 wherein R is selected from the group consisting of 1,2-ethylene, 1,2-propylene, 3 - chloro - 1,2 - propylene, and 1,2-butylene, and R' is selected from the group consisting of 1,2-phenylene, 3,4,5,6 - tetrachloro-1,2-phenylene, 3,4,5,6-tetrabromo-1,2-phenylene, 1,4,5,6,7,7 - hexachlorobicyclo - (2,2,1) - 5-heptenylene-2,3-, 1,2-ethylene, and 1,2-ethenylene, and said R''' is the residue attached to the active hydrogens of an aliphatic alcohol and $f$ has a value of at least one.

31. The composition of claim 28 wherein R is selected from the group consisting of 1,2-ethylene, 1,2-propylene, 3 - chloro - 1,2 - propylene, and 1,2-butylene, and R' is selected from the group consisting of 1,2-phenylene, 3,4,5,6 - tetrachloro - 1,2 - phenylene, 3,4,5,6 - tetrabromo-1,2-phenylene, 1,4,5,6,7,7 - hexachlorobicyclo - (2,2,1) - 5-heptenylene-2,3-, 1,2-ethylene, and 1,2-ethenylene, and said R''' is the residue attached to the active hydrogens of a carboxylic acid or hydroxy-carboxylic acid.

32. The composition of claim 28 wherein R is selected from the group consisting of 1,2-ethylene, 1,2-propylene, 3-chloro-1,2-propylene, and 1,2-butylene, and R' is selected from the group consisting of 1,2-phenylene, 3,4,5,6-tetrachloro-1,2-phenylene, 3,4,5,6-tetrabromo-1,2-phenylene, 1,4,5,6,7,7-hexachlorobicyclo-(2,2,1)-5-heptenylene-2,3-, 1,2-ethylene, and 1,2-ethenylene, and said R''' is the residue attached to the active hydrogens of a sulfhydryl radical containing compound and f has a value ranging from one to six.

33. The composition of claim 28 wherein R is selected from the group consisting of 1,2-ethylene, 1,2-propylene, 3-chloro-1,2-propylene, and 1,2-butylene, and R' is selected from the group consisting of 1,2-phenylene, 3,4,5,6-tetrachloro-1,2-phenylene, 3,4,5,6-tetrabromo-1,2-phenylene, 1,4,5,6,7,7-hexachlorobicyclo-(2,2,1)-5-heptenylene-2,3-, 1,2-ethylene, and 1,2-ethenylene, and said R''' is the residue attached to the active hydrogens of an aliphatic polyol having from three to eight carbon atoms and from three to eight hydroxyl radicals, and f has a value ranging from three to eight.

34. The composition of claim 28 wherein R is selected from the group consisting of 1,2-ethylene, 1,2-propylene, 3-chloro-1,2-propylene, and 1,2-butylene, and R' is selected from the group consisting of 1,2-phenylene, 3,4,5,6-tetrachloro-1,2-phenylene, 3,4,5,6-tetrabromo-1,2-phenylene, 1,4,5,6,7,7-hexachlorobicyclo-(2,2,1)-5-heptenylene-2,3-, 1,2-ethylene, and 1,2-ethenylene, and said R''' is the residue attached to the active hydrogens of a saccharide and f has a value of at least four.

35. A hydroxyl-terminated polyester-ether polyol with an equivalent weight from at least 90 to about 1500 and having the general formula

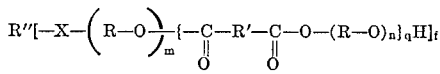

wherein R'' is the residue derived from a polymerization starter R''(XH)$_f$ selected from the group consisting of organic compounds having at least three radicals selected from the group consisting of hydroxyl, carboxyl and sulfhydryl radicals, X is a divalent radical selected from the group consisting of oxygen and sulfur, f is an integer having a value of at least three, R is selected from the group consisting of 1,2-ethylene, 1,2-propylene, 3-chloro-1,2-propylene, and 1,2-butylene, R' is a cyclic hydrocarbon radical selected from the group consisting of 1,2-phenylene, 3,4,5,6-tetrachloro-1,2-phenylene, 3,4,5,6-tetrabromo-1,2-phenylene, and 1,4,5,6,7,7-hexachlorobicyclo-(2,2,1)-5-heptenylene-2,3-, m is an integer varying from zero to ten, n is a positive integer having a minimum value of one with the average value of n being at least 1.5, q is an integer varying from zero to about 10 with an average value such that the mols of R' radicals per kilogram of polymer varies from at least 0.5 to 4.2, and with the total mol ratio of R to R' being more than 2.0.

36. The composition of claim 35 in which R'' is derived from an aliphatic polyol having from three to fifteen carbon atoms and from three to eight hydroxyl radicals, and f has a value of from three to eight.

37. The composition of claim 35 in which R'' is the residue derived from a polymerization starter selected from the group consisting of saccharides having from five to 18 carbon atoms and from four to 11 hydroxyl radicals, hydrates of such saccharides, aqueous solutions of such saccharides, alcoholic solutions of such saccharides and alcoholic glucosides, and f has an average value of at least three.

38. The composition of claim 37 in which said saccharide is selected from the group consisting of dextrose and alpha methyl glucoside.

39. The composition of claim 35 in which the said R'' is derived from a saccharide having more than three monosaccharide units per molecule.

40. The composition of claim 39 in which the said saccharide is selected from the group consisting of cyclodextrins and solubilized starches.

41. The composition of claim 35 in which said R'' is derived from a starter mixture consisting of from five to 80 percent by weight of a dextrin selected from the group consisting of white corn dextrins, canary corn dextrins and British Gums, and from 20 to 95 percent by weight of a polyol having from three to six carbon atoms and from three to six hydroxyl groups.

42. The composition of claim 35 in which said R'' is derived from a starter mixture consisting of from five to 80 percent by weight of a starch selected from the group consisting of corn starch, potato starch, and wheat starch, and from 20 to 95 percent by weight of a polyol having from three to six carbon atoms and from three to six hydroxyl groups.

43. A hydroxyl-terminated polyester-polyether polyol having an equivalent weight of at least about 300 and having the general formula

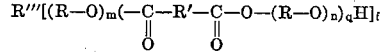

wherein R''' is the residue derived from a polymerization starter R'''(H)$_f$ selected from the group consisting of water, hydrogen sulfide and organic compounds having at least two radicals selected from the group consisting of hydroxyl, carboxyl and sulfhydryl radicals, f is an integer having a value of at least two, R is selected from the group consisting of 1,2-ethylene, 1,2-propylene, 3-chloro-1,2-propylene and 1,2-butylene, R' is a hydrocarbon radical with from 40 to 100 percent by weight of said radical being selected from the group consisting of —CH$_2$—CH$_2$— and —CH$_2$—CH$_2$—CH$_2$— radicals and from 0 to 60 percent by weight of said radical being selected from the group consisting of 1,2-phenylene, 3,4,5,6-tetrachloro-1,2-phenylene, 3,4,5,6-tetrabromo-1,2-phenylene, and 1,4,5,6,7,7-hexachlorobicyclo-(2,2,1)-5-heptenylene-2,3-, m is an integer with a value of from zero to ten, n is a positive integer with a minimum value of one and with the average value of n being at least 1.5 and q is an integer with a value ranging from zero to about 50 with the average value of q ranging from about 0.5 to about 40, and with the total mol ratio of R to R' being greater than 2.0.

44. A polyester-ether copolymer having a molecular weight of at least about 1500 and having the general formula

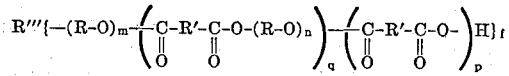

wherein R''' is the residue derived from a polymerization starter R'''(H)$_f$ selected from the group consisting of water, hydrogen sulfide, and organic compounds having at least one radical selected from the group consisting of hydroxyl, carboxyl, and sulfhydryl radicals, f is an integer having a value of at least one, R is selected from the group consisting of 1,2-ethylene, 1,2-propylene, 3-chloro-1,2-propylene, and 1,2-butylene, R' is a hydrocarbon radical composed of from 25 to 100 percent by weight of an ethylenically unsaturated lower aliphatic radical selected from the group consisting of —CH=CH— and

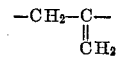

radicals, with the remainder being selected from the group consisting of 1,2-phenylene, 3,4,5,6-tetrachloro-1,2-phenylene, 3,4,5,6-tetrabromo-1,2-phenylene, and 1,4,5,6,7,7-hexachlorobicyclo-(2,2,1)-5-heptenylene-2,3-, m is an integer with a value of from zero to ten, n is a positive integer with a minimum value of one and with the average value of n being at least 1.5 and q is an integer with a value ranging from zero to about 25, and said copolymer having identical R''' residues having a ratio of weight-average molecular weight to number-average molecular weight of less than 1.5, p is an integer with a value of zero and one, with the average value of $p$ ranging from zero to one, and with the total mol ratio of R to R' being greater than 2.0.

45. A carboxylic acid-terminated polyether-ester copolymer having an equivalent weight of at least 100 and having the general formula

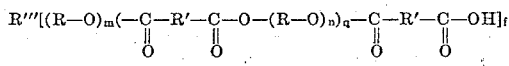

wherein R''' is the residue derived from a polymerization starter R'''(H)$_f$ selected from the group consisting of water, hydrogen sulfide and organic compounds having at least two radicals selected from the group consisting of hydroxyl, carboxyl, and sulfhydryl radicals, R is selected from the group consisting of 1,2-ethylene, 1,2-propylene, 3-chloro-1,2-propylene and 1,2-butylene, R' is selected from the group consisting of 1,2-ethylene, 1,2-ethenylene, 1,2-phenylene, 3,4,5,6-tetrachloro-1,2-phenylene, 3,4,5,6-tetrabromo-1,2-phenylene, and 1,4,5,6,7,7-hexachlorobicyclo-(2,2,1)-5-heptenylene-2,3-, $m$ is an integer with a value of from zero to ten, $n$ is a positive integer with a minimum value of one and with the average value of $n$ being at least 1.5 and $q$ is an integer with a value ranging from zero to about 10, with the average value of $q$ being greater than zero.

46. The process of claim 14 in which said monoether is propylene oxide, and said anhydride is phthalic anhydride.

47. The process of claim 14 in which said monoether is propylene oxide, and said anhydride is 3,4,5,6-tetrachlorophthalic anhydride.

48. The process of claim 14 in which said monoether is propylene oxide, and said anhydride is 3,4,5,6-tetrabromophthalic anhydride.

49. The process of claim 14 in which said monoether is propylene oxide, and said anhydride is 1,4,5,6,7,7-hexachlorobicyclo-(2,2,1)-5-heptene-2,3-dicarboxylic acid anhydride.

50. The composition of claim 36 in which said R is 1,2-propylene, and said R' is 1,2-phenylene.

51. The composition of claim 36 in which said R is 1,2-propylene and said R' is 3,4,5,6-tetrachloro-1,2-phenylene.

52. The composition of claim 36 in which said R is 1,2-propylene, and said R' is 3,4,5,6-tetrabromo-1,2-phenylene.

53. The composition of claim 36 in which R is 1,2-propylene, and said R' is 1,4,5,6,7,7-hexachlorobicyclo-(2,2,1)-5-heptenylene-2,3-.

54. The copolymer of claim 44 in which said remainder of said R' is 1,2-phenylene.

55. The copolymer of claim 44 in which said remainder of said R' is 3,4,5,6-tetrachloro-1,2-phenylene.

56. The copolymer of claim 44 in which said remainder of said R' is 3,4,5,6-tetrabromo-1,2-phenylene.

57. The copolymer of claim 44 in which said remainder of said R' is 1,4,5,6,7,7-hexachlorobicyclo-(2,2,1)-5-heptenylene-2,3-.

References Cited

UNITED STATES PATENTS

| | | | |
|---|---|---|---|
| 2,962,524 | 11/1960 | Hostettler et al. | 260—484 |
| 3,089,863 | 5/1963 | Hicks et al. | 260—75 |
| 3,254,060 | 5/1966 | Connolly et al. | 260—78.4 |

JOSEPH L. SCHOFER, Primary Examiner

J. KIGHT, Assistant Examiner

U.S. Cl. X.R.

260—18, 75, 77.5, 78.5, 861